(12) United States Patent
Wang et al.

(10) Patent No.: US 9,796,823 B2
(45) Date of Patent: Oct. 24, 2017

(54) SHRINK FILMS

(71) Applicant: NOVA Chemicals (International) S.A., Fribourg (CH)

(72) Inventors: XiaoChuan Wang, Calgary (CA); Douglas Walter Checknita, Calgary (CA); John Leonard Bayley, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 15/203,865

(22) Filed: Jul. 7, 2016

(65) Prior Publication Data

US 2017/0015801 A1  Jan. 19, 2017

(30) Foreign Application Priority Data

Jul. 17, 2015 (CA) ..................... 2897552

(51) Int. Cl.
*C08F 210/00* (2006.01)
*C08L 23/16* (2006.01)
(Continued)

(52) U.S. Cl.
CPC ............. *C08J 5/18* (2013.01); *B32B 27/08* (2013.01); *B32B 27/32* (2013.01); *C08F 210/16* (2013.01);
(Continued)

(58) Field of Classification Search
CPC ............ C08F 210/16; C08F 2500/10; C08F 2500/12; C08F 2500/26; C08L 23/16; C08L 2314/00; C08L 2205/02; C08L 2205/025

See application file for complete search history.

(56) References Cited

U.S. PATENT DOCUMENTS 4,105,609 A    8/1978  Machon et al.
4,314,912 A    2/1982  Lowery, Jr. et al.
(Continued)

FOREIGN PATENT DOCUMENTS

WO    2012044291 A1    4/2012

OTHER PUBLICATIONS

Deslauriers, Paul J., Rohlfing, David C. and Hsieh, Eric T.; Quantifying short chain branching microstructures in ethylene 1-olefin copolymers using size exclusion chromatography and Fourier transform infrared spectroscopy (SEC-FTIR); Polymer 43 (2002); Copyright 2001 Published by Elsevier Science Ltd.; Downloaded from www.elsevier.com/locate/polymer; pp. 159-170.
(Continued)

*Primary Examiner* — Rip A Lee
(74) *Attorney, Agent, or Firm* — Lawrence T. Kale

(57) ABSTRACT

Films suitable for shrink film applications are disclosed comprising at least one heterogeneous ethylene interpolymer having a short chain branching distribution profile index, $DPI^{SCB}$, that satisfies the formula: $-1 \leq DPI^{SCB} \leq 1$. The at least one heterogeneous ethylene interpolymer has a density from about 0.911 g/cm³ to about 0.942 g/cm³, a melt index from about 0.2 dg/min to about 3.5 dg/min and is produced using an in-line Ziegler-Natta catalyst. Additional embodiments include shrink films prepared from blends of at least one heterogeneous ethylene interpolymer and at least one high pressure ethylene polymer. The disclosed shrink films have improved puncture strength and machine direction shrink tunnel shrink force relative to control shrink films of the same composition but the control heterogeneous ethylene interpolymer, produced with a batch Ziegler-Natta catalyst, has a $DPI^{SCB}$ greater than 1.0.

19 Claims, 12 Drawing Sheets

(51) Int. Cl.
*C08J 5/18* (2006.01)
*C08F 210/16* (2006.01)
*B32B 27/08* (2006.01)
*B32B 27/32* (2006.01)

(52) U.S. Cl.
CPC ..... *B32B 2270/00* (2013.01); *B32B 2307/736* (2013.01); *B32B 2439/00* (2013.01); *C08J 2323/06* (2013.01); *C08J 2323/08* (2013.01); *C08J 2423/06* (2013.01); *C08J 2423/08* (2013.01)

(56) References Cited

U.S. PATENT DOCUMENTS

| | | | |
|---|---|---|---|
| 4,379,882 | A | 4/1983 | Miyata |
| 4,731,438 | A | 3/1988 | Bernier |
| 4,748,221 | A | 5/1988 | Collomb et al. |
| 4,803,259 | A | 2/1989 | Zboril et al. |
| 5,376,439 | A | 12/1994 | Hodgson et al. |
| 6,180,730 | B1 | 1/2001 | Sibtain et al. |
| 6,340,532 | B1* | 1/2002 | Huang .................... B32B 27/32 428/516 |
| 8,546,499 | B2* | 10/2013 | Garroff ................ C08F 210/16 526/124.7 |
| 2005/0154159 | A1* | 7/2005 | DesLauriers ........... C08F 10/00 526/156 |
| 2012/0316301 | A1* | 12/2012 | Minh Hoang ........ C08F 210/16 526/126 |
| 2016/0083539 | A1* | 3/2016 | Wang ........................ C08J 5/18 428/523 |
| 2016/0108221 | A1 | 4/2016 | Sibtain et al. |

OTHER PUBLICATIONS

ASTM D5748-95 (Reapproved 2012); Standard Test Method for Protrusion Puncture Resistance of Stretch Wrap Film; Copyright ASTM International; Provided by IHS under license with ASTM (Jul. 22, 2015); pp. 1-4.

ASTM D6645-01 (Reapproved 2010); Standard Test Method for Methyl (Comonomer) Content in Polyethylene by Infrared Spectrophotometry; Copyright ASTM International (2001); pp. 1-3.

ASTM E1709-09; Standard Test Method for Measurement of Retroreflective Signs Using a Portable Retroreflectometer at a 0.2 Degree Observation Angle; Copyright ASTM International; Approved Jul. 1, 2009, Published Feb. 2010; pp. 1-6.

ASTM D1922-09; Standard Test Method for Propagation Tear Resistance of Plastic Film and Thin Sheeting by Pendulum Method; Copyright ASTM International (2009); Approved May 1, 2009, Published Jun. 2009; pp. 1-7.

ASTM D1505-10; Standard Test Method for Density of Plastics by the Density-Gradient Technique; Copyright ASTM International (2010); Approved Jul. 1, 2010, Published Sep. 2010, pp. 1-7.

ASTM D882-12; Standard Test Method for Tensile Properties of Thin Plastic Sheeting; Copyright ASTM International (2012); Approved Aug. 2, 2012, Published Sep. 2012; pp. 1-11.

ASTM D6474-12; Standard Test Method for Determining Molecular Weight Distribution and Molecular Weight Averages of Polyolefins by High Temperature Gel Permeation Chromatography; Copyright ASTM International (2012); Approved Dec. 15, 2012, Published Dec. 2012; pp. 1-6.

ASTM D792-13; Standard Test Methods for Density and Specific Gravity (Relative Density) of Plastics by Displacement; Copyright ASTM International (2013); Approved Nov. 1, 2013, Published Nov. 2013; pp. 1-6.

ASTM D1238-13; Standard Test Method for Melt Flow Rates of Thermoplastics by Extrusion Plastometer; Copyright ASTM International (2013); Approved Aug. 1, 2013, Published Aug. 2013; pp. 1-16.

* cited by examiner

FIGURE 7a: Testing Device
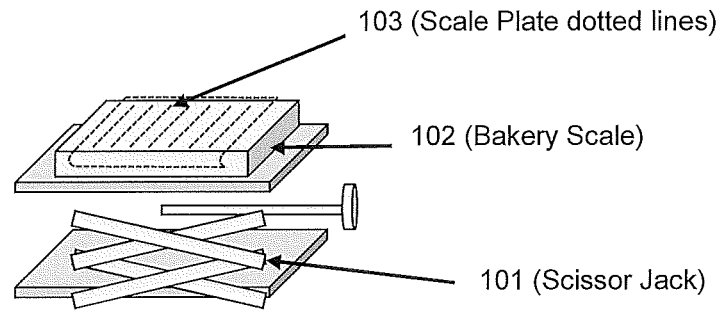
FIGURE 7b: Testing Fixture
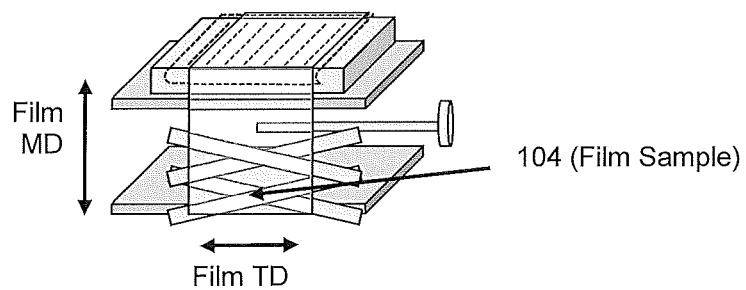
FIGURE 7c: Testing Fixture After Shrink Tunnel
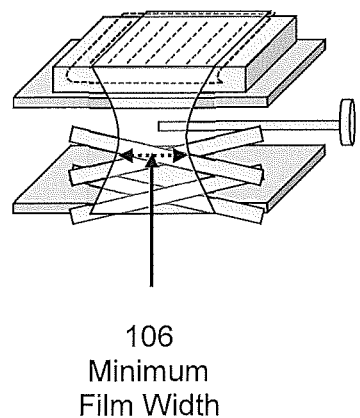

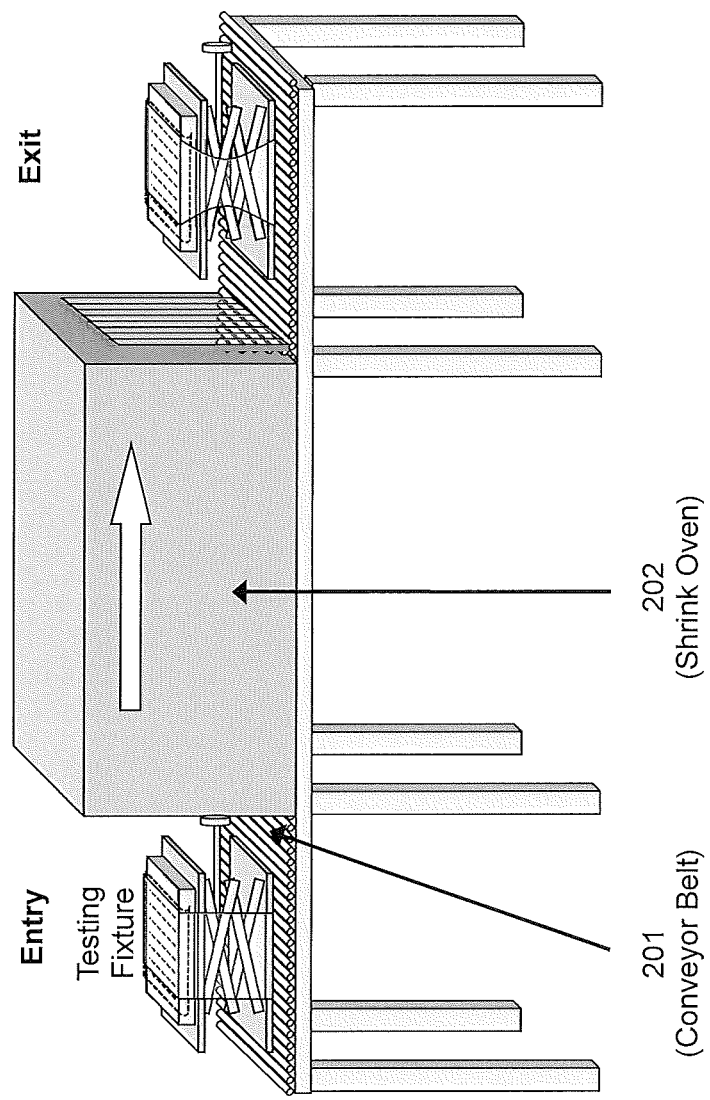

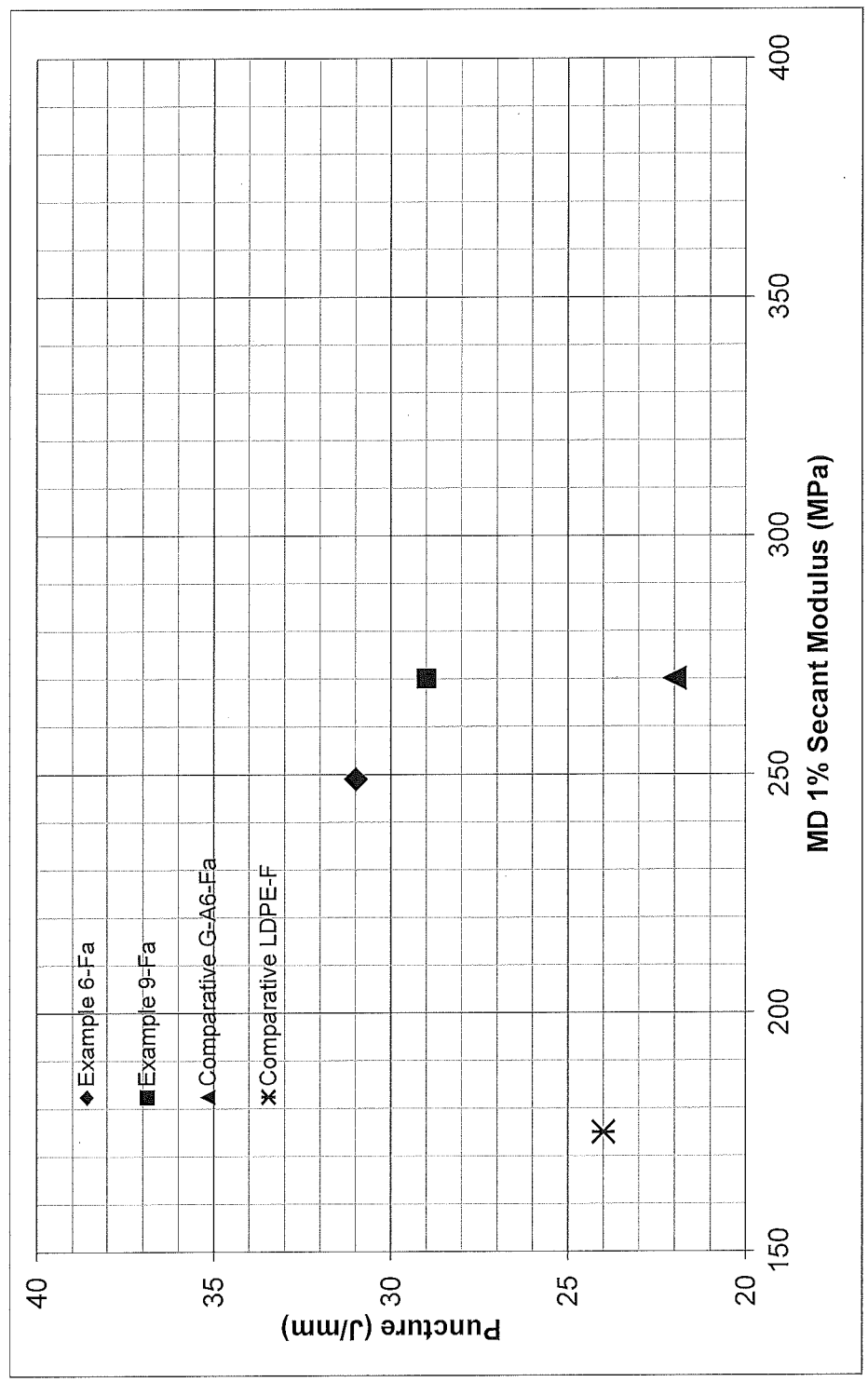

SHRINK FILMS

FIELD OF DISCLOSURE

This disclosure relates to heterogeneous ethylene interpolymers and their use in film applications, particularly shrink film applications.

BACKGROUND OF THE DISCLOSURE

In general, shrink films can be categorized as conventional shrink films or specialized shrink films. "Conventional shrink films" are packaging films used to collate groups of articles into a unitized package for the purpose of handling, shipping, distribution and final sale. Conventional shrink films are typically manufactured using blown film processes; both monolayer and multilayer films are commonly produced. In general, conventional shrink films shrink anisotropically, e.g., films may shrink 65 to 85% in the machine direction (MD) and −10 to 20% in the transverse direction (TD). Higher shrinkage in the MD is used advantageously by circumferentially wrapping articles such that the shrink film's MD direction is oriented in the circumferential wrapping direction. Non-limiting examples of articles that are frequently wrapped with conventional shrink film include: canned soup, canned fish, bottles and cans of beverages such as water, soft drinks, beer, energy drinks, liquid protein drinks and multipacks of bottles or cans. In some cases multiple articles (e.g., 12 or 24 bottles) contained within a tray are wrapped with shrink film and after passage through a shrink tunnel a secure unitized package is produced that can be easily handled and shipped. Any suitable material may be used to construct the tray, e.g., cardboard or plastics. Rather than a tray, a case may be used to contain the multiple articles and the case shrink wrapped. In addition loose articles may be shrink wrapped, i.e., a tray or case is not employed. In some cases, the unitized package (post-shrink state) is not completely wrapped with shrink film, i.e., the package has an open end which is not encapsulated with shrink film, e.g., the side-opening in a case of shrink wrapped bottle water. In other cases, the unitized package is completely encapsulated with shrink film. In some applications the shrink film may be pigmented and/or printed such that a high-quality image is displayed for advertising and/or promotional purposes. Conventional shrink films benefit from the optimal selection of ethylene polymer and/or an optimal blend of the most appropriate ethylene polymers; non-limiting examples of ethylene polymers include plastomers, very-low density polyethylene (VLDPE), linear-low density polyethylene (LLDPE), medium density polyethylene (MDPE), high density polyethylene (HDPE), high pressure low density polyethylene (LDPE) and copolymers of ethylene and vinyl acetate (EVA). In this disclosure, plastomers, VLDPE, LLDPE, MDPE and HDPE are "ethylene polymers", i.e., macromolecules comprising ethylene and optionally one or more comonomers and manufactured using any catalyst or polymerization process. Conventional shrink films may have a monolayer or multilayer construction; non-limiting examples of multilayer films include films containing 2 to 11 layers where the chemical composition of each layer may be the same or different.

In addition to conventional shrink film, a second category of shrink film is specialized shrink film. "Specialized shrink films" are manufactured such that the film's shrink properties fall within specific limits; non-limiting examples of properties include MD % shrink, TD % shrink, MD shrink force, TD shrink force, film clarity or film sealability, etc. Specialized shrink films are manufactured by non-conventional techniques, non-limiting examples include double-bubble processes, the triple-bubble processes or tenter frame processes. Frequently, in the film and packaging industries, specialized shrink films are also called "biaxially oriented shrink films". A non-limiting example of a specialized shrink film is a film that shrinks about 50% in the MD and about 50% in the TD; after shrinking, such a film produces a smooth and uniform wrapping on articles of various shapes; non-limiting examples of shapes include the wrapping of square, rectangular or round consumer goods, e.g. CD cases, books, magazines, boxes, etc. Specialized shrink films may also be used to shrink wrap large items; non-limiting examples include pallets, industrial equipment, cars, or boats, etc. Specialized shrink films are also used to produce smooth and uniformly wrapped food products; non-limiting examples include cheese, red meat and poultry, etc. Specialized shrink films may have a monolayer or multilayer construction; non-limiting examples of multilayer films include films containing 2 to 11 layers. Generally, multilayer films contain chemically distinct layers that impart additional characteristics; non-limiting examples of characteristics include water vapor resistance, oxygen barrier resistance or puncture resistance. Specialized shrink films benefit from the optimal selection of an ethylene polymer and/or an optimal blend of the most appropriate ethylene polymers; non-limiting examples include, plastomers, very-low density polyethylene (VLDPE), linear-low density polyethylene (LLDPE), medium density polyethylene (MDPE), high density polyethylene (HDPE), high pressure low density polyethylene (LDPE) and copolymers of ethylene and vinyl acetate (EVA). Typically, in specialized shrink films, high pressure LDPE is used less frequently or in lower concentrations relative to conventional shrink films. A variety of processes can be used to apply a specialized shrink film to the article to be wrapped and to heat/shrink wrap the film around the article(s); non-limiting examples of the latter include a heated shrink tunnel, hot water bath, steam bath, etc.

There is a constant need to develop improved shrink films. Non-limiting examples of desirable improvements in shrink films include: specific film shrinkages (%) in the machine and transverse direction, a specific film holding force, improved film tensile strength (after shrinkage), improved load retention, acceptable film stiffness, improved film puncture resistance and/or film toughness, specific film optical properties and acceptable film sealing properties. Film optical properties such as low haze, high gloss and clarity may (or may not) be important depending on the application, e.g., low haze, high gloss and high clarity are desired if the product must be clearly visible though the shrink wrap film or if the shrink film is printed and the printed image functions as a product advertisement.

Disclosed herein, shrink films comprising at least one heterogeneous ethylene interpolymer, made using an in-line Ziegler-Natta catalyst, having a Type II pseudo-flat comonomer distribution profile has improved properties; for example, improved puncture and machine direction shrink tunnel shrink force; relative to comparative shrink films comprising at least one heterogeneous ethylene interpolymer, made with a conventional Ziegler-Natta catalyst, having a conventional Type IV comonomer distribution profile.

SUMMARY OF THE DISCLOSURE

One embodiment of this disclosure is a shrink film comprising at least one heterogeneous ethylene interpolymer having a short chain branching Distribution Profile Index, $DPI^{SCB}$, that satisfies formula (I)

$$-1 \leq DPI^{SCB} \leq 1 \qquad (I).$$

In another embodiment, the shrink film comprises at least one heterogeneous ethylene interpolymer having: a short chain branching distribution profile index ($DPI^{SCB}$) that satisfies formula (I), a density from about 0.911 g/cm³ to about 0.942 g/cm³ and a melt index from about 0.2 dg/min to about 3.5 dg/min; where density is measured according to ASTM D-1505 and melt index is measured according to ASTM D-1238 at 190° C. and 2.16 kg.

In another embodiment, the shrink film comprises at least one heterogeneous ethylene interpolymer having: a short chain branching distribution profile index ($DPI^{SCB}$) that satisfies formula (I), a density from about 0.911 g/cm³ to about 0.936 g/cm³ and a melt index from about 0.3 dg/min to about 0.9 dg/min.

In another embodiment, the shrink film comprises at least one heterogeneous ethylene interpolymer having: a short chain branching distribution profile index ($DPI^{SCB}$) that satisfies formula (I) and a molecular weight distribution, Mw/Mn, from about 2.5 to 6.0; where Mw/Mn is measured according to ASTM D6474-12.

In another embodiment, the shrink film comprises at least one heterogeneous ethylene interpolymer having a short chain branching distribution profile index ($DPI^{SCB}$) that satisfies formula (I) and the at least one heterogeneous ethylene interpolymer is produced using an in-line Ziegler-Natta catalyst.

In another embodiment, the shrink film comprises at least one heterogeneous ethylene interpolymer having a short chain branching distribution profile index ($DPI^{SCB}$) that satisfies formula (I) and the at least one heterogeneous ethylene interpolymer contains one or more α-olefin; where the α-olefin is linear or branched $C_3$ to $C_{12}$.

In another embodiment, the shrink film comprises at least one heterogeneous ethylene interpolymer having a short chain branching distribution profile index ($DPI^{SCB}$) that satisfies formula (I) and the one or more α-olefin in the at least one heterogeneous ethylene interpolymer is 1-hexene, 1-octene or both.

In another embodiment, the shrink film comprises from about 85 weight percent to about 20 weight percent of at least one heterogeneous ethylene interpolymer having a short chain branching distribution profile index ($DPI^{SCB}$) that satisfies formula (I), and; from about 15 weight percent to about 80 weight percent of at least one high pressure ethylene polymer; where weight percent is based on the total weight of the shrink film.

In another embodiment, the shrink film comprises from about 80 weight percent to about 40 weight percent of at least one heterogeneous ethylene interpolymer having a short chain branching distribution profile index ($DPI^{SCB}$) that satisfies formula (I), and; from about 20 weight percent to about 60 weight percent of at least one high pressure ethylene polymer; where weight percent is based on the total weight of the shrink film.

In another embodiment, the shrink film comprises from about 85 weight percent to about 20 weight percent of at least one heterogeneous ethylene interpolymer having a short chain branching distribution profile index ($DPI^{SCB}$) that satisfies formula (I), a density from about 0.911 g/cm³ to about 0.942 g/cm³ and a melt index from about 0.2 dg/min to about 3.5 dg/min; from about 15 weight percent to about 80 weight percent of at least one high pressure ethylene polymer having a density from about 0.917 g/cm³ to about 0.940 g/cm³ and a melt index from about 0.1 g/10 minutes to about 10 g/10 minutes; where weight percent is based on the total weight of the shrink film.

In another embodiment, the shrink film comprises: from about 85 weight percent to about 20 weight percent of at least one heterogeneous ethylene interpolymer having a short chain branching distribution profile index ($DPI^{SCB}$) that satisfies formula (I), a density from about 0.911 g/cm³ to about 0.936 g/cm³ and a melt index from about 0.3 dg/min to about 0.9 dg/min and; from about 15 weight percent to about 80 weight percent of at least one high pressure ethylene polymer having a density from about 0.918 g/cm³ to about 0.930 g/cm³ and a melt index from about 0.2 g/10 minutes to about 2 g/10 minutes; where weight percent is based on the total weight of the shrink film.

In another embodiment, the shrink film comprises: from about 80 weight percent to about 40 weight percent of at least one heterogeneous ethylene interpolymer having a short chain branching distribution profile index ($DPI^{SCB}$) that satisfies formula (I), a density from about 0.911 g/cm³ to about 0.936 g/cm³ and a melt index from about 0.3 dg/min to about 0.9 dg/min, and; from about 20 weight percent to about 60 weight percent of at least one high pressure ethylene polymer having a density from about 0.918 g/cm³ to about 0.930 g/cm³ and a melt index from about 0.2 g/10 minutes to about 2 g/10 minutes, and; the shrink film puncture strength is improved at least 30%, relative to a control shrink film of the same composition but the heterogeneous ethylene interpolymer in the control shrink film has a $DPI^{SCB}$ greater than 1.0; where film puncture strength is measured according to ASTM D5748-95 and weight percent is based on the total weight of the shrink film.

In another embodiment, the shrink film comprises: from about 80 weight percent to about 40 weight percent of at least one heterogeneous ethylene interpolymer having a short chain branching distribution profile index ($DPI^{SCB}$) that satisfies formula (I), a density from about 0.911 g/cm³ to about 0.936 g/cm³ and a melt index from about 0.3 dg/min to about 0.9 dg/min, and; from about 20 weight percent to about 60 weight percent of at least one high pressure ethylene polymer having a density from about 0.918 g/cm³ to about 0.930 g/cm³ and a melt index from about 0.2 g/10 minutes to about 2 g/10 minutes, and; the shrink film has at least 8% improved machine direction shrink tunnel shrink force, relative to a control film of the same composition but the heterogeneous ethylene interpolymer in the control film has a $DPI^{SCB}$ greater than 1.0; where machine direction shrink tunnel shrink force is recorded after passing the shrink film through a shrink tunnel at conveyor speeds from about 30 feet/minute to about 60 feet/min, the shrink tunnel is maintained at 400° F. and weight percent is based on the total weight of the shrink film.

In another embodiment, the shrink film comprises: from about 85 weight percent to about 20 weight percent at least one heterogeneous ethylene interpolymer having a short chain branching distribution profile index ($DPI^{SCB}$) that satisfies formula (I), a density from about 0.911 g/cm³ to about 0.942 g/cm³ and a melt index, $I_2$, from about 0.2 dg/min to about 3.5 dg/min and; from about 15 weight percent to about 80 weight percent of at least one high pressure ethylene polymer having a density from about 0.917 g/cm³ to about 0.940 g/cm³ and a melt index from about 0.1 g/10 minutes to about 10 g/10 minutes; wherein the shrink film has improvements in at least one or more of the following properties, film puncture, machine direction shrink tunnel shrink force, dart impact strength, machine direction tear strength, transverse direction tear strength, machine direction tensile strength at break, transverse direction tensile strength at break, percent shrinkage in the machine direction, percent shrinkage in the transverse direction and maximum holding force; relative to a control shrink film of the same composition but the heterogeneous ethylene interpolymer in the control shrink film has a $DPI^{SCB}$ greater than 1.0.

In another embodiment, a multilayer shrink film is provided, having a shrink layer and at least one other layer; wherein the shrink layer comprises at least one heterogeneous ethylene interpolymer having a short chain branching distribution profile index ($DPI^{SCB}$) that satisfies formula (I).

In another embodiment, a multilayer shrink film is provided, having a shrink layer and at least one other layer; wherein the shrink layer comprises at least one heterogeneous ethylene interpolymer having, a short chain branching distribution profile index ($DPI^{SCB}$) that satisfies formula (I), a density from about 0.911 g/cm$^3$ to about 0.942 g/cm$^3$ and a melt index from about 0.2 dg/min to about 3.5 dg/min.

In another embodiment, a multilayer shrink film is provided, having a shrink layer and at least one other layer; wherein the shrink layer comprises at least one heterogeneous ethylene interpolymer having, a short chain branching distribution profile index ($DPI^{SCB}$) that satisfies formula (I), a density from about 0.911 g/cm$^3$ to about 0.936 g/cm$^3$ and a melt index from about 0.3 dg/min to about 0.9 dg/min.

In another embodiment, a multilayer shrink film is provided, having a shrink layer and at least one other layer; wherein the shrink layer comprises at least one heterogeneous ethylene interpolymer having, a short chain branching distribution profile index ($DPI^{SCB}$) that satisfies formula (I) and a molecular weight distribution, Mw/Mn, from about 2.5 to about 6.0.

In another embodiment, a multilayer shrink film is provided, having a shrink layer and at least one other layer; wherein the shrink layer comprises at least one heterogeneous ethylene interpolymer having, a short chain branching distribution profile index ($DPI^{SCB}$) that satisfies formula (I) and the at least one heterogeneous ethylene interpolymer is produced with an in-line Ziegler-Natta catalyst.

In another embodiment, a multilayer shrink film is provided, having a shrink layer and at least one other layer; wherein the shrink layer comprises at least one heterogeneous ethylene interpolymer having, a short chain branching distribution profile index ($DPI^{SCB}$) that satisfies formula (I) and the at least one heterogeneous ethylene interpolymer contains one or more α-olefin; where the α-olefin is linear or branched $C_3$ to $C_{12}$.

In another embodiment, a multilayer shrink film is provided, having a shrink layer and at least one other layer; wherein the shrink layer comprises at least one heterogeneous ethylene interpolymer having, a short chain branching distribution profile index ($DPI^{SCB}$) that satisfies formula (I) and the at least one heterogeneous ethylene interpolymer contains one or more α-olefin; wherein the α-olefin is 1-hexene, 1-octene or both.

In another embodiment, a multilayer shrink film is provided, having a shrink layer and at least one other layer; wherein the shrink layer comprises from about 85 weight percent to about 20 weight percent of at least one heterogeneous ethylene interpolymer having a short chain branching distribution profile index ($DPI^{SCB}$) that satisfies formula (I), a density from about 0.911 g/cm$^3$ to about 0.942 g/cm$^3$ and a melt index from about 0.2 dg/min to about 3.5 dg/min and; from about 15 weight percent to about 80 weight percent of at least one high pressure ethylene polymer having a density from about 0.917 g/cm$^3$ to about 0.940 g/cm$^3$ and a melt index from about 0.1 g/10 minutes to about 10 g/10 minutes; where weight percent is based on the total weight of the shrink layer.

In another embodiment, a multilayer shrink film is provided, having a shrink layer and at least one other layer; wherein the shrink layer comprises from about 80 weight percent to about 40 weight percent of at least one heterogeneous ethylene interpolymer having a short chain branching distribution profile index ($DPI^{SCB}$) that satisfies formula (I), a density from about 0.911 g/cm$^3$ to about 0.936 g/cm$^3$ and a melt index from about 0.3 dg/min to about 0.9 dg/min and; from about 20 weight percent to about 60 weight percent of at least one high pressure ethylene polymer having a density from about 0.918 g/cm$^3$ to about 0.930 g/cm$^3$ and a melt index from about 0.2 g/10 minutes to about 2 g/10 minutes; where weight percent is based on the total weight of the shrink layer.

It is well known to those of ordinary experience in the art that crosslinking of shrink films may improve film properties, e.g., film puncture strength or film barrier properties. Non-limiting examples of crosslinking include peroxide crosslinking, γ-irradiation crosslinking or β-irradiation crosslinking. The shrink films disclosed herein have excellent properties in uncrosslinked form; however, the shrink films of this disclosure may be further improved by crosslinking. The shrink films of this disclosure may also be further improved through the use of multi-layering techniques, non-limiting examples include multilayer films containing from two to eleven layers, wherein the heterogeneous ethylene polymers disclosed herein may be used in one or more layers of the multilayer film structure; in addition, multiple layers (characterized by the claims herein) may differ in chemical composition.

BRIEF DESCRIPTION OF THE DRAWINGS

The following Figures are presented for the purpose of illustrating selected embodiments of this disclosure; it being understood, that the embodiments in this disclosure are not limited to the specific examples shown.

FIG. 7a shrink tunnel testing device, FIG. 7b testing fixture and FIG. 7c testing fixture after passing through the shrink tunnel.

FIG. 8, shrink tunnel.

FIG. 9a, film puncture strength (J/mm) as a function of film modulus (machine direction 1% secant modulus (MPa)) for monolayer films Example 6-Fa, Example 9-Fa and Comparative G-A6-Fa containing 60 weight % LDPE, and; a monolayer film Comparative LDPE-F containing 100% LDPE.

DEFINITION OF TERMS

Figure 1:
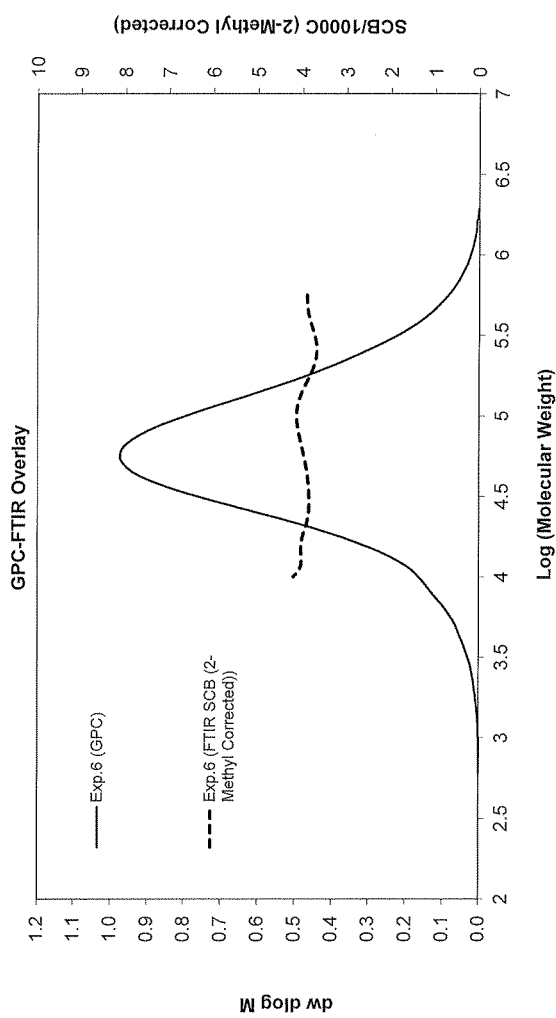
FIG. 1, GPC-FTIR curve of Example 6 (the "2-Methyl Correction" was applied to the raw GPC-FTIR data).

In order to form a more complete understanding of this disclosure, the following terms are defined and should be used with the accompanying figures and the description of the various embodiments throughout.

The short chain branching Distribution Profile Index, "$DPI^{SCB}$", is defined by formula (II);

$$DPI^{SCB} = SCB_{Log(M1)} - SCB_{Log(M2)} \quad (II)$$

where $SCB_{Log(M1)}$ and $SCB_{Log(M2)}$ are determined by GPC-FTIR; $SCB_{Log(M1)}$ is the amount of short chain branching (2-Methyl Corrected) in the fraction of ethylene polymer eluting from the GPC column at a Log(M1) of 4.35, i.e. a M1 (molecular weight) of 22,387 dalton; and $SCB_{Log(M2)}$ is the amount of short chain branching (2-Methyl Corrected) in the fraction of ethylene polymer eluting from the GPC column at a Log(M2) of 5, i.e. a M2 of 100,000 dalton. $SCB_{Log(M1)}$, $SCB_{Log(M1)}$ and $DPI^{SCB}$ have units of SCB/1000C, where C represents the element carbon "C".

$DPI^{SCB}$ (units of SCB/1000C) was used to define the following four types of heterogeneous ethylene interpolymers; Type I, II, III and IV:

1. Type I $DPI^{SCB}$: flat comonomer distribution profile; $DPI^{SCB}=0$
2. Type II $DPI^{SCB}$: pseudo-flat comonomer distribution profile; $-1 \leq DPI^{SCB} \leq 1$
3. Type III $DPI^{SCB}$: reverse comonomer distribution profile, and; $DPI^{SCB} < -1$
4. Type IV $DPI^{SCB}$: normal comonomer distribution profile; $DPI^{SCB} > 1$ The term "heterogeneous catalyst" is meant to convey its conventional meaning, namely, a heterogeneous catalyst produces a "heterogeneous ethylene interpolymer" characterized by a heterogeneous or non-uniform chemical composition distribution. A heterogeneous ethylene interpolymer is a blend comprising ethylene interpolymer macromolecules that differ significantly in chemical composition; i.e. some ethylene interpolymers in the blend contain a very small amount of α-olefin (a non-limiting example would be 0 wt % α-olefin), while some ethylene interpolymers in the blend contain a relatively large amount of α-olefin (a non-limiting example would be 50 wt % α-olefin). While not wishing to be bound by theory, it is generally believed by those of ordinary skill in the art that heterogeneous catalysts contain multiple catalytic sites that differ in their ability to incorporate an α-olefin into a propagating macromolecular chain.

The term "homogeneous catalyst" is meant to convey its conventional meaning, namely, a homogeneous catalyst produces a "homogeneous ethylene interpolymer" characterized by a homogeneous or uniform chemical composition distribution. Homogeneous catalysts are also called "metallocene catalysts" or "single-site catalysts". Not wishing to be bound by theory, it is generally believed that homogeneous catalysts possess one catalytic site which incorporates α-olefin into the propagating macromolecular chain in a statistically consistent manner.

Whether an ethylene interpolymer is heterogeneous or homogeneous can be determined using a variety of experimental techniques; non limiting examples include Differential Scanning calorimetry, hereafter DSC, or CRYSTAF/Temperature Rising Elution Fractionation, hereafter C-TREF. In the case of heterogeneous ethylene interpolymers, from about 0.91 g/cc to about 0.942 g/cc, multiple melting peaks are typically observed in the DSC scan; multiple peaks reflect the presence of ethylene interpolymers that differ significantly in chemical composition. Similarly, multiple peaks are typically observed in the C-TREF curves of heterogeneous ethylene interpolymers. In contrast, homogeneous ethylene interpolymers have one DSC melting peak and one peak in the C-TREF curve. A single peak, observed in DSC and C-TREF, reflects that fact that homogeneous ethylene interpolymers have a uniform chemical composition.

The term "in-line Ziegler-Natta catalyst" refers to the continuous synthesis of a small quantity of active Ziegler-Natta catalyst and immediately injecting this catalyst into a continuously operating solution reactor, wherein in-line heterogeneous ethylene interpolymers are formed. An in-line Ziegler-Natta catalyst is a heterogeneous catalyst. The term "in-line Ziegler-Natta procatalyst" refers to the continuous synthesis of a small quantity of inactive Ziegler-Natta procatalyst and immediately injecting this procatalyst into a continuously operating solution reactor; the procatalyst is activated within the reactor by injecting one or more chemical compounds called an "activator"; non-limiting examples of activators include aluminum alkyls.

The terms "batch Ziegler-Natta catalyst" or "batch Ziegler-Natta procatalyst" refer to catalysts prepared in a batch process, where a large quantity of catalyst or procatalyst is prepared in one or more mixing vessels in a multi-step process. Once prepared, the batch Ziegler-Natta catalyst or procatalyst, is transferred to a catalyst storage vessel. The catalyst or procatalyst is subsequently transferred to a continuously operating polymerization reactor as needed. The procatalyst may be converted into an active catalyst in the polymerization reactor or external to the reactor. The large quantity of catalyst or procatalyst prepared allows one to operate a continuous polymerization process for an extended period of time, e.g., from about 3 months to about 1 day.

As used herein, the term "monomer" refers to a small molecule that may chemically react and become chemically bonded with itself or other monomers to form a polymer. As used herein, the term "α-olefin" is used to describe a monomer having a hydrocarbon chain containing from 3 to 20 carbon atoms and having one double bond at one end of the chain. In the polyethylene art, the term "comonomer" is frequently used as an equivalent term for α-olefin.

As used herein, the term "ethylene polymer", refers to macromolecules produced from ethylene and optionally one or more additional comonomers, regardless of the catalyst or process used to make the ethylene polymer. The term "homopolymer" refers to a polymer that contains only one type of monomer, e.g., ethylene. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described in this paragraph.

The term "ethylene interpolymer" refers to a subset of polymers within the "ethylene polymer" group that excludes polymers produced in high pressure polymerization processes. In this disclosure, the term "high pressure ethylene polymer" refers to ethylene polymers produced in high pressure polymerization processes.

The term "heterogeneous ethylene interpolymer" refers to a subset of polymers in the ethylene interpolymer group that are produced using heterogeneous catalysts. As defined above, heterogeneous ethylene polymers are further classified into one of the following types: Type I ($DPI^{SCB}=0$); Type II ($-1 \leq DPI^{SCB} \leq 1$); Type III ($DPI^{SCB} < -1$) or; Type IV ($DPI^{SCB} > 1$).

The term "homogeneous ethylene interpolymer" refers to a subset of polymers in the ethylene interpolymer group that are produced using homogeneous catalysts, e.g., metallocene or single-site catalysts. Typically, homogeneous ethylene interpolymers have narrow molecular weight distributions, for example, gel permeation chromatography (GPC) Mw/Mn values of less than 2.8; where Mw and Mn refer to weight and number average molecular weights, respectively. In contrast, the Mw/Mn of heterogeneous ethylene interpolymers are typically greater than the Mw/Mn of homogeneous ethylene interpolymers. Homogeneous ethylene interpolymers also have narrow comonomer distributions, as described above.

In this disclosure, the category or term "homogeneous ethylene interpolymer" includes "linear homogeneous ethylene interpolymers" that do not contain long chain branching, and; "substantially linear homogeneous ethylene interpolymers" that contain a small amount of long chain branching, e.g., less than 10 long chain branches per 1,000 carbon atoms. A "long chain branch" is macromolecular in nature, i.e., similar in length relative to the macromolecule that the long chain branch is attached to.

The term "thermoplastic" refers to a polymer that becomes liquid when heated, flows under pressure and solidifies when cooled. Thermoplastic polymers include ethylene polymers as well as other polymers used in the plastic industry; non-limiting examples, polyethylene terephthalate (PET), polyamides and the like.

As used herein the term "monolayer film" refers to a film containing a single layer of one or more thermoplastics. "Multilayer films" comprise 2 or more film layers, typically, at least 2 layers differ in chemical composition.

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

DETAILED DESCRIPTION

Short Chain Branching Distribution Profile Index ($DPI^{SCB}$)

The heterogeneous ethylene interpolymers disclosed herein have a short chain branching distribution profile index ($DPI^{SCB}$) that satisfies formula (I);

$$-1 \leq DPI^{SCB} \leq 1 \qquad (I).$$

Table 1 discloses nine examples, Examples 1 through 9, of heterogeneous ethylene polymers having $DPI^{SCB}$ values between −0.290 and 0.993 SCB/1000C; these polymers were synthesized using an in-line Ziegler-Natta catalyst and NOVA Chemicals Advanced SCLAIRTECH™ solution process (described below). Table 1 also discloses the values of $SCB_{Log(M1)}$ and $SCB_{Log(M2)}$ that were used to calculate $DPI^{SCB}$ using the following formula (II);

$$DPI^{SCB} = SCB_{Log(M1)} - SCB_{Log(M2)} \qquad (II).$$

Figure 2:
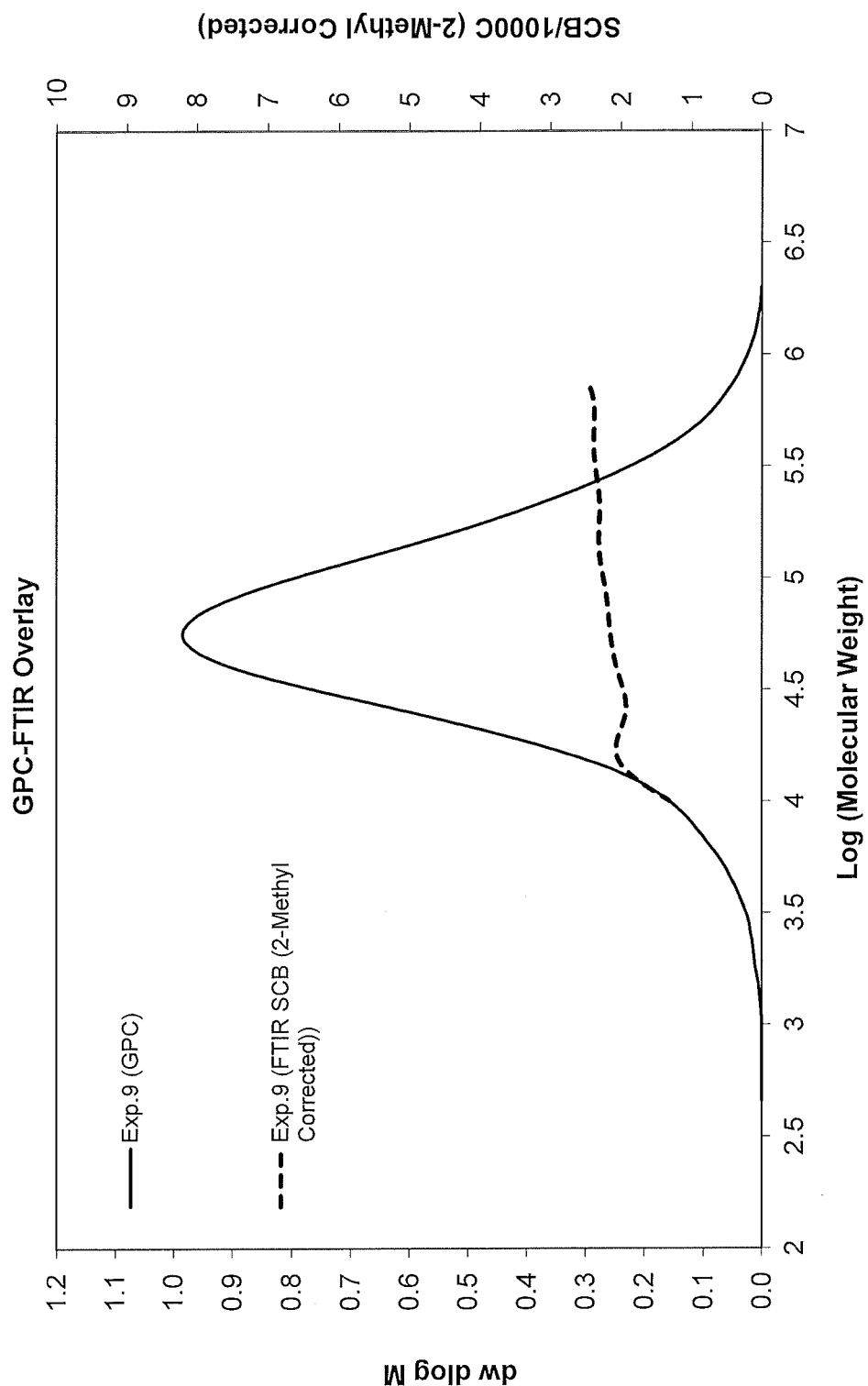
FIG. 2, GPC-FTIR curve of Example 9 (the "2-Methyl Correction" was applied to the raw GPC-FTIR data).

In this disclosure, formula (I) defines a class of heterogeneous ethylene interpolymer called "Type II"; which have a pseudo-flat comonomer distribution profile. FIG. 1 illustrates the pseudo-flat comonomer distribution profile for Example 6 having a $DPI^{SCB}$ of −0.25 SCB/1000C. To be more clear, the GPC-FTIR plot in FIG. 1 shows FTIR SCB/1000C data (the dotted line) that is essentially flat, or pseudo-flat, across the entire GPC molecular weight distribution (the solid bell-shaped curve). Similarly, as shown in FIG. 2 and Table 1, Example 9 has a Type II pseudo-flat comonomer distribution profile having a $DPI^{SCB}$ of −0.290 SCB/1000C.

Table 1 also discloses twelve Comparative Examples of heterogeneous ethylene interpolymers having $DPI^{SCB}$ values between 1.23 and 4.73 SCB/1000C; these Comparative Examples were synthesized using batch Ziegler-Natta catalysts or procatalysts. In this disclosure, formula (III) defines a class of heterogeneous ethylene interpolymer called "Type IV" having a normal comonomer distribution profile that characterizes the Comparative Examples shown in Table 1.

$$DPI^{SCB} > 1 \qquad (III)$$

Figure 3:
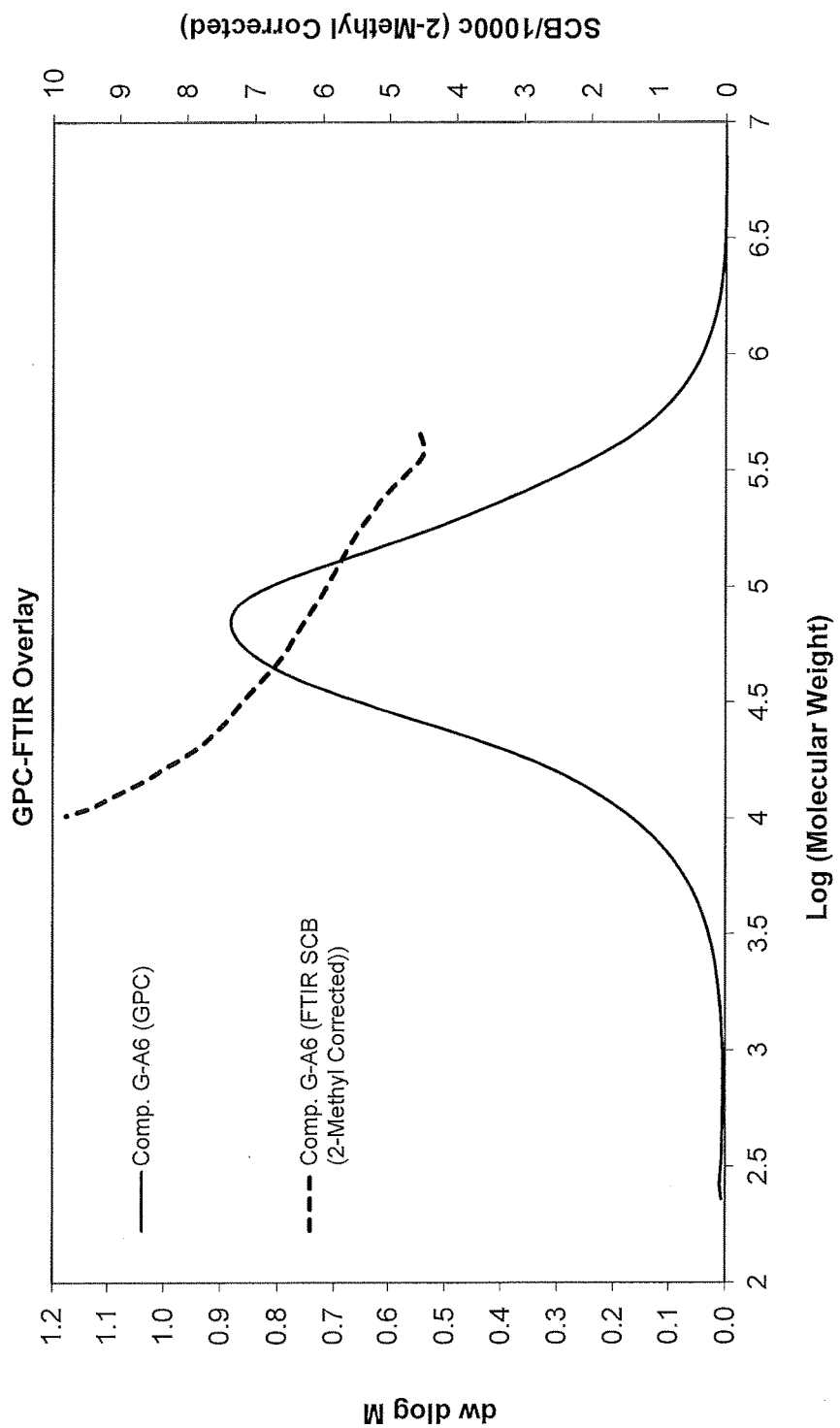
FIG. 3, GPC-FTIR curve of Comparative G-A6 (the "2-Methyl Correction" was applied to the raw GPC-FTIR data).

FIG. 3 shows the comonomer distribution profile for Comparative Example G-A6; this is the typical profile, or normal profile, observed in the case of conventional heterogeneous ethylene interpolymers produced with a batch Ziegler-Natta catalyst or procatalyst. To be more clear, the GPC-FTIR data for Comparative Example G-A6 in FIG. 3 shows a FTIR SCB/1000C curve (the dotted line) that decreases rapidly as GPC molecular weight increases (the solid bell-shaped curve). Table 1 also discloses the values of $SCB_{Log(M1)}$ and $SCB_{Log(M2)}$ that were used to calculate the $DPI^{SCB}$ of Comparative Example G-A6 using formula (II). Comparative G-A6 is a conventional heterogeneous ethylene interpolymer produced using a batch Ziegler-Natta catalyst in a gas phase process.

Comparative Examples in Table 1 were produced in a comparative solution process or comparative gas phase processes. All Comparative Examples are Type IV heterogeneous ethylene interpolymers having $DPI^{SCB}>1.0$. Comparative S1 through S3 are heterogeneous ethylene/1-octene interpolymers produced using a batch Ziegler-Natta catalyst and The Dow Chemical Company (Midland, Mich., USA) solution process. Comparative S1 through S3 have $DPI^{SCB}$ values of 4.73, 2.57 and 2.27 SCB/1000C, respectively. Comparative S1 through S3 are known commercially as DOWLEX™ 2645G, DOWLEX™ 2045 and DOWLEX™ 2388, respectively. Comparative G-A1 through G-A7 are heterogeneous ethylene/1-hexene interpolymers produced using a batch Ziegler-Natta catalyst and NOVA Chemicals' NOVAPOL® gas phase process. Comparative G-A1 through G-A7 have $DPI^{SCB}$ values from 1.23 to 4.08 SCB/1000C. Comparative G-A1 through G-A7 are known commercially as NOVAPOL® TD-9022-C, NOVAPOL® TF-0119-D, NOVAPOL® TF-0219E, NOVAPOL® TF-Y822-CP, NOVAPOL® TF-Y826-CP, NOVAPOL® TF-Y534-IP and NOVAPOL® TR-0242-UJ, respectively. Comparative G-B1 and G-B2 are heterogeneous ethylene-1-hexene interpolymers produced using a batch Ziegler-Natta catalyst and Westlake Chemical Corporation's (Houston, Tex., USA) gas-phase process. Comparative G-B1 and G-B2 have $DPI^{SCB}$ values of 2.40 and 2.80 SCB/1000C, respectively. Comparative G-B1 and G-B2 are known commercially as HIFOR Xtreme® SC74853 and HIFOR Xtreme® SC74558, respectively.

Figure 4:
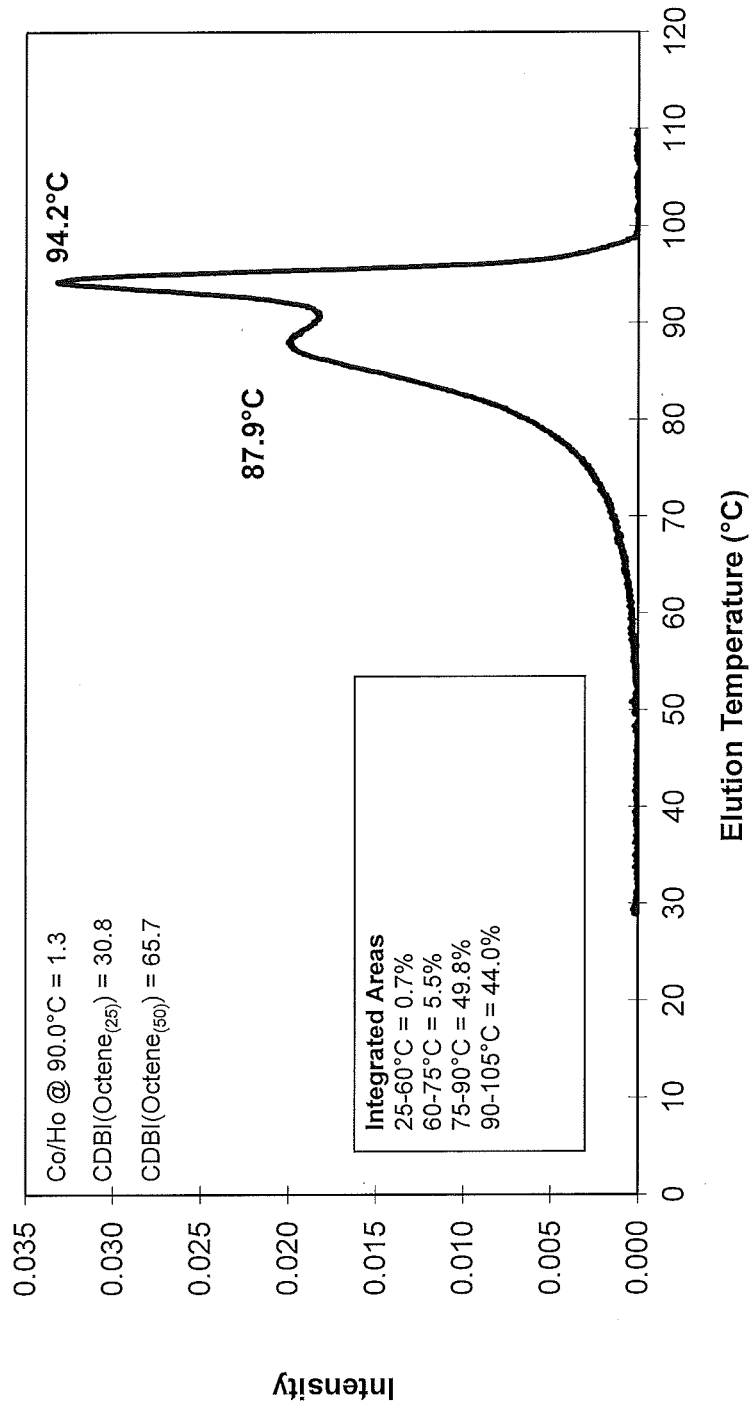
FIG. 4, C-TREF curve of Example 6.
Figure 5:
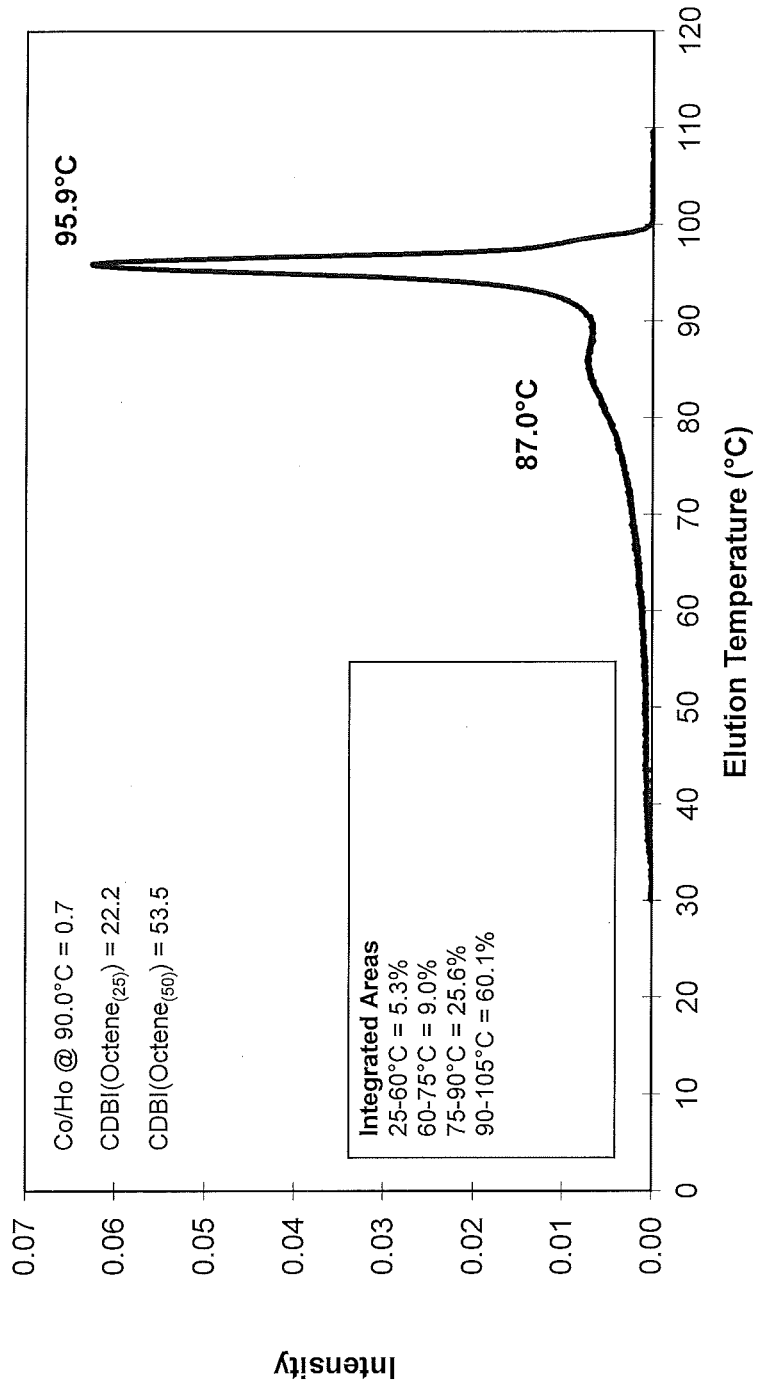
FIG. 5, C-TREF curve of Comparative G-A6.

The heterogeneous nature of Example 6 is shown in FIG. 4, i.e. two peaks are evident in the C-TREF curve, a major peak eluting at 94.2° C. and a shoulder eluting at 87.9° C. The C-TREF curve of Comparative G-A6 is shown in FIG. 5. Comparative G-A6 is a heterogeneous ethylene interpolymer, as indicated by the two C-TREF peaks at 95.9° C. and 87.0° C.

In-Line Ziegler-Natta Catalyst

In this disclosure an in-line Ziegler-Natta catalyst or procatalyst was synthesized and injected into a solution polymerization reactor to produce a heterogeneous ethylene interpolymer having a Type II $DPI^{SCB}$ defined by formula (I). The content of this section is presented for the purpose of illustrating one embodiment disclosing the synthesis of an in-line Ziegler-Natta catalyst; it being understood, that this embodiment does not limit the claims presented.

Figure 6:
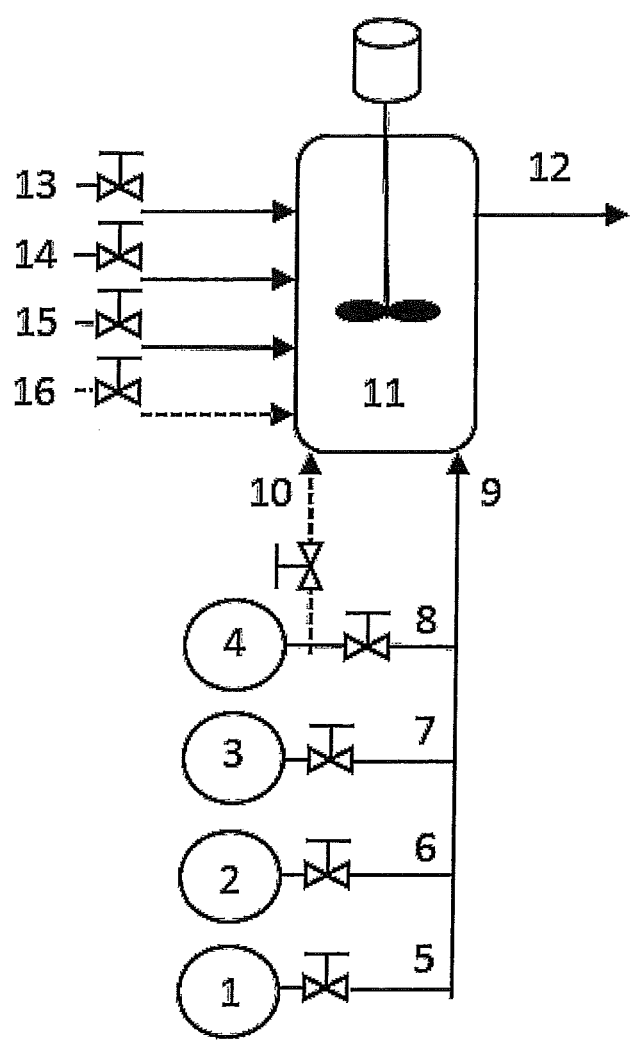
FIG. 6, process to prepare an in-line Ziegler-Natta catalyst.

As shown in FIG. 6, an in-line Ziegler-Natta catalyst or procatalyst is synthesized in a catalyst assembly and injected into reactor 11 via stream 9; the catalyst assembly is defined by vessels 1 through 4 and streams 5 through 10. Vessel 1 contains a solution of a magnesium compound, hereafter component (i), and an aluminum alkyl, hereafter component (v), in a process solvent. Non-limiting examples of suitable process solvents include linear or branched $C_5$ to $C_{12}$ alkanes or mixtures thereof. Non-limiting examples of component (i) include $Mg(R^1)_2$; where the $R^1$ groups may be the same or different, linear, branched or cyclic hydrocarbyl radicals containing 1 to 10 carbon atoms. Non-limiting examples of component (v) include $Al(R^3)_3$, where the $R^3$ groups may be the same or different, linear, branched or cyclic hydrocarbyl radicals containing from 1 to 10 carbon atoms. In FIG. 6, vessel 2 contains a solution of chloride compound, hereafter component (ii), in process solvent. Non-limiting examples of component (ii) include $R^2Cl$; wherein $R^2$ represents a hydrogen atom, or a linear, branched or cyclic hydrocarbyl radical containing 1 to 10 carbon atoms. Vessel 3 contains a solution of metal compound, hereafter component (iii), in process solvent. Non-limiting examples component (iii) include $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of component (iii) include Group 4 to Group 8 metal alkyls, metal alkoxides (which may be prepared by reacting a metal alkyl with an alcohol) and mixed-ligand metal compounds that contain a mixture of halide, alkyl and alkoxide ligands. Vessel 4 contains a solution of an alkyl aluminum co-catalyst, hereafter component (iv), in process solvent. A wide variety of component (iv) compounds are suitable, as expressed by formula (IV):

$$Al(R^4)_p(OR^5)_q(X)_r \qquad (IV)$$

where the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

Referring to FIG. 6, an embodiment of an in-line Ziegler-Natta catalyst may be synthesized using the following steps: (1) in the first step, stream 5 containing components (i) and (v) are combined with stream 6 containing component (ii), the intermixing of streams 5 and 6 produces a magnesium chloride precipitate suspended in process solvent; (2) in the second step, stream 7 containing component (iii) is added and intermixed with the magnesium chloride precipitate, and; (3) in the third step stream 8 containing component (iv) is added forming an in-line Ziegler-Natta catalyst in stream 9.

An efficient in-line Ziegler-Natta catalyst is formed by optimizing the following molar ratios: [component (v)/component (i)]; [component (ii)/component (i)]; [component (iv)/component (iii)], and; [component (v)]/[component (iii)]. In addition, an efficient in-line Ziegler-Natta catalyst is formed by optimizing the time that the various streams have to react.

The upper limit on the [component (v)/component (i)] molar ratio in stream 5 may be about 70, in some cases about 50 and is other cases about 30. The lower limit on the [component (v)/component (i)] molar ratio may be about 3.0, in some cases about 5.0 and in other cases about 10. The upper limit on the [component (ii)/component (i)] molar ratio may be about 4, in some cases about 3.5 and is other cases about 3.0. The lower limit on the [component (ii)/component (i)] molar ratio may be about 1.0, in some cases about 1.5 and in other cases about 1.9. The time between the addition of component (ii) and the addition of component (iii) via stream 7 is controlled; this time is called HUT-1 (Hold Up Time-1). HUT-1 is the time for combined streams 5 and 6 to react and equilibrate forming the magnesium chloride support. The upper limit on HUT-1 may be about 70 seconds, in some cases about 60 seconds and is other cases about 50 seconds. The lower limit on HUT-1 may be about 5 seconds, in some cases about 10 seconds and in other cases about 20 seconds. HUT-1 is controlled by adjusting the length of the conduit between stream 6 injection port and stream 7 injection port, as well as controlling the flow rates of streams 5 and 6.

The time between the addition of component (iii) and the addition of component (iv) via stream 8 is controlled; hereafter HUT-2. HUT-2 is the time for the magnesium chloride support and component (iii) to equilibrate. The upper limit on HUT-2 may be about 50 seconds, in some cases about 35 seconds and is other cases about 25 seconds. The lower limit on HUT-2 may be about 2 seconds, in some cases about 6 seconds and in other cases about 10 seconds. HUT-2 is controlled by adjusting the length of the conduit between stream 7 injection port and stream 8 injection port, as well as controlling the flow rates of streams 5, 6 and 7.

The quantity of component (iv) added is optimized to produce an efficient catalyst; this is accomplished by adjusting the [component (iv)/component (iii)] molar ratio. The upper limit on the [component (iv)/component (iii)] molar ratio may be about 10, in some cases about 7.5 and is other cases about 6.0. The lower limit on the [component (iv)/component (iii)] molar ratio may be 0, in some cases about 1.0 and in other cases about 2.0. The time between the addition of the component (iv) via stream 8 and the injection of the in-line Ziegler-Natta catalyst into reactor 11 is controlled; hereafter HUT-3. The upper limit on HUT-3 may be about 15 seconds, in some cases about 10 seconds and is other cases about 8 seconds. The lower limit on HUT-3 may be about 0.5 seconds, in some cases about 1 seconds and in other cases about 2 seconds. HUT-3 is controlled by adjusting the length of the conduit between stream 8 injection port and the catalyst injection port in reactor 11, and by controlling the flow rates of streams 5-8. Although not shown in FIG. 6, optionally, portions of stream 9 (the in-line Ziegler-Natta catalyst) may be injected into more than one solution reactor; or multiple catalyst assemblies may be employed to synthesize in-line Ziegler-Natta catalysts for each of the multiple solution reactors.

Referring to FIG. 6, 100% of component (iv) may be added via stream 8 to activate the in-line Ziegler Natta procatalyst in the catalyst assembly, or; optionally (as indicated by the dotted line), 100% of component (iv) may be added directly to reactor 11 via stream 10, in this case an in-line Ziegler-Natta procatalyst is injected into reactor 11 via stream 9 and the procatalyst is activated in reactor 11, or; optionally, a portion of component (iv) may be added to the solution process through stream 8 and the remaining portion of component (iv) may be added via stream 10. To be more clear, non-limiting examples of the required amount of component (iv) (required to form an efficient in-line Ziegler-Natta catalyst) flowing through stream 8 may be 100%, 80%, 60%, 40%, 20% or 0%; with the balance flowing through stream 10, i.e. 0%, 20%, 40%, 60%, 80% and 100%, respectively.

The quantity of in-line Ziegler-Natta catalyst (or procatalyst) added via stream 9 to reactor 11 is expressed as the parts-per-million (ppm) of component (iii) in the reactor solution, hereafter "R1 (iii) (ppm)". The upper limit on R1 (iii) (ppm) may be about 10 ppm, in some cases about 8 ppm and in other cases about 6 ppm. The lower limit on R1 (iii) (ppm) in some cases may be about 0.5 ppm, in other cases about 1 ppm and in still other cases about 2 ppm. The [component (v)/component (iii)] molar ratio in reactor 11 is controlled. The upper limit on the [component (v)/component (iii)] molar ratio in the reactor may be about 2, in some cases about 1.5 and is other cases about 1.0; while the lower limit may be about 0.05, in some cases about 0.075 and in other cases about 0.1.

Any combination of the components that comprise the catalyst assembly may be heated or cooled, i.e., vessels 1-4 and/or streams 5-10; in some cases the upper temperature limit on these components may be about 90° C., in other cases about 80° C. and in still other cases about 70° C. and; in some cases the lower temperature limit may be about 20° C.; in other cases about 35° C. and in still other cases about 50° C. The pressure the catalyst assembly generates is not particularly important, provided the catalyst assembly pressure is high enough to inject the catalyst or procatalyst into reactor 11.

Upon injection of the in-line Ziegler-Natta catalyst, or procatalyst, into reactor 11 a Type H heterogeneous ethylene interpolymer is formed within the process solvent in reactor 11; this solution exits the reactor via exit stream 12.

FIG. 6 also shows the following reactor feed streams: process solvent 13; ethylene 14; comonomer 15, e.g., one or more $C_3$ to $C_{12}$ α-olefins, and; optionally a chain transfer agent 16. A non-limiting example of a chain transfer agent includes hydrogen, which may be added to control the molecular weight of heterogeneous ethylene interpolymer. It is not particularly important that each feed streams is individually injected into reactor 11 as shown in FIG. 6. For example, various feed streams may be combined in all possible combinations prior to reactor injection; i.e. reactor 11 may have 4, 3, 2 or 1 feed injection ports. Any combination of the reactor feed streams 13-16 may be heated or cooled: the upper limit on feed stream temperatures may be about 90° C.; in other cases about 80° C. and in still other cases about 70° C. The lower limit on reactor feed stream temperatures may be about −20° C.; in other cases about 0° C. and in still other cases about 20° C.

Reactor feeds, including process solvent, are generally purified to remove potential catalyst poisons such as water, oxygen or other polar impurities. Feed purification follows standard practices in the art, e.g. molecular sieves, alumina beds and oxygen removal catalysts are used for the purification of monomers.

Comparative Batch Ziegler-Natta Catalyst

Batch Ziegler-Natta catalyst formulations suitable for producing heterogeneous ethylene interpolymers are well known in the art. For example, Lowery et al. (U.S. Pat. No. 4,314,912) discloses a batch Ziegler-Natta catalyst suitable for use in a high temperature solution polymerization process. Lowery discloses the following method to prepare a batch Ziegler-Natta catalyst: to 247 pounds of Isopar E® (a mixture of saturated isoparaffins having 8 to 9 carbon atoms) is added 133 pounds of 0.516 M [di(n-butyl)magnesium)$_2$.triethylaluminum] complex; an 11.75-lb portion of hydrogen chloride gas is added to the foregoing solution of the complex with agitation; the resultant slurry is cooled to ambient temperature (~25° C.) and 322 ml of neat tetra (isopropoxy)titanium is added; the resulting catalyst is diluted with Isopar E® to give 500 pounds of total catalyst; this catalyst is added continuously to a 6900-gallon reactor along with 40,000 lbs/hr of ethylene and Isopar E®; the amounts of catalyst and Isopar E® are varied to maintain a reactor temperature of at least 185° C.; hydrogen is added to the reactor to control molecular weight of the polymer such that the polymer has a melt index of 2.5 to 12 dg/min.

In Lowery et al. (U.S. Pat. No. 4,314,912) a multi-step synthetic method was used to prepare a 500 pound batch of catalyst; and this batch Ziegler-Natta catalyst was subsequently added to a solution polymerization reactor to form a heterogeneous ethylene interpolymer.

Batch Ziegler-Natta catalysts are also typically used in gas phase and slurry processes. For example, Collomb et al. (U.S. Pat. No. 4,748,221) discloses a batch Ziegler-Natta catalyst suitable for use in a gas phase process. Collomb discloses the following method to prepare a batch Ziegler-Natta catalyst: into a 1-liter glass flask provided with a stirrer system and a heating and cooling device, there are introduced under an atmosphere of nitrogen at 20° C., 500 ml of n-hexane, 8.8 g of magnesium in powder form and 1.2 g of iodine successively; with stirring, the reaction mixture is heated to 80° C., and there are rapidly introduced 9.1 g of titanium tetrachloride and 13.7 g of tetra(propyl)titanate, then slowly over 4 hours 74.5 g of n-butyl chloride; at the end of this time, the reaction mixture thus obtained is maintained for 2 hours with stirring and at 80° C., and it is then cooled to ambient temperature (20° C.); the precipitate obtained is then washed three times with n-hexane to give the solid catalyst (A) ready for use.

In Collomb et al. (U.S. Pat. No. 4,748,221) a multi-step synthetic method was used to prepare solid catalyst (A) was prepared; and this batch Ziegler-Natta catalyst was subsequently added to a gas phase fluidized bed reactor to produce a heterogeneous ethylene interpolymer.

Solution Polymerization Process

Returning to the subject matter of this disclosure; the operating temperature of the solution polymerization reactor may vary over a wide range. For example, the upper limit on reactor temperatures in some cases may be about 300° C., in other cases about 280° C. and in still other cases about 260° C.; and the lower limit in some cases may be about 80° C., in other cases about 100° C. and in still other cases about 125° C.

The operating pressure of a solution polymerization reactor can vary over a wide range. For example, the upper limit on reactor pressure in some cases may be about 45 MPag, in other cases about 30 MPag and in still other cases about 20 MPag; and the lower limit in some cases may be about 3 MPag, in other some cases about 5 MPag and in still other cases about 7 MPag. The pressure in the polymerization reactor should be high enough to maintain the polymerization solution as a single phase solution and to provide the upstream pressure to force the polymer solution from the reactors through one or more heat exchangers, gas/liquid separators and on to polymer recovery operations.

In a solution polymerization process, the ethylene concentration in the reactor is controlled; where ethylene concentration is defined as the weight of ethylene in the reactor divided by the total weight of everything added to the reactor. The reactor ethylene concentration in some cases may vary from about 7 weight percent (wt %) to about 25 wt %, in other cases from about 8 wt % to about 20 wt % and in still other cases from about 9 wt % to about 17 wt %.

In a solution polymerization process, the total amount of ethylene converted ($Q^T$) in the reactor is monitored; $Q^T$=100×[weight of ethylene in the interpolymer]/([weight of ethylene in the interpolymer]+[weight of unreacted ethylene]). The upper limit on $Q^T$ in some cases is about 99%, in other cases about 95% and in still other cases about 90%; the lower limit on $Q^T$ in some cases is about 75%, in other cases about 80% and in still other cases about 85%.

In this disclosure, the number of reactors is not particularly important; with the proviso that the continuous solution polymerization process comprises at least one reactor. In the case of two or more polymerization reactors, the reactors may be operated in series or parallel mode. In series mode, effluent from the first reactor flows directly into the second reactor. In parallel mode, the effluent from the first reactor by-passes the second reactor and is combined with the effluent from the second reactor downstream of the second reactor. In the case of two reactors connected in series, the second reactor (R2) is typically operated at a higher temperature than the first reactor (R1). The maximum temperature difference between these two reactors ($T^{R2}-T^{R1}$) in some cases is about 120° C., in other cases about 100° C. and in still other cases about 80° C.; the minimum ($T^{R2}-T^{R1}$) in some cases is about 1° C., in other cases about 5° C. and in still other cases about 10° C.

Any reactor shape or design may be employed in a solution polymerization process; non-limiting examples include unstirred or stirred spherical, cylindrical or tank-like vessels, as well as tubular reactors or recirculating loop reactors. At commercial scale the maximum reactor volume in some cases may be about 20,000 gallons (about 75,710 L), in other cases about 10,000 gallons (about 37,850 L) and in still other cases about 5,000 gallons (about 18,930 L). At commercial scale the minimum reactor volume in some cases may be about 100 gallons (about 379 L), in other cases about 500 gallons (about 1,893 L) and in still other cases about 1,000 gallons (about 3,785 L). At pilot plant scales, reactor volumes are smaller, for example the reactor volumes less than about 2 gallons (less than about 7.6 L). In the case of a continuously stirred tank reactor (CSTR) the stirring rate can vary over a wide range; in some cases from about 10 rpm to about 2000 rpm, in other cases from about 100 to about 1500 rpm and in still other cases from about 200 to about 1300 rpm.

The "average reactor residence time", a commonly used parameter in the chemical engineering art, is defined by the first moment of the reactor residence time distribution; the reactor residence time distribution is a probability distribution function that describes the amount of time that a fluid element spends inside the reactor. In the solution process, the average reactor residence time can vary widely depending on process flow rates and reactor mixing, design and capacity. The upper limit on the average reactor residence time of the solution in a solution reactor in some cases may be about 720 seconds, in other cases about 480 seconds and in still other cases about 240 seconds. The lower limit on the average reactor residence time of the solution in a solution reactor may be about 1 second, in other cases about 5 seconds and in still other cases about 10 seconds.

The stream exiting the reactor, or reactors, comprises: solvent; heterogeneous ethylene interpolymer; unreacted ethylene, comonomer and hydrogen; active catalyst; deactivated catalyst, and; impurities. A catalyst deactivator is added to the stream exiting the reactor, to terminate further polymerization, forming a deactivated reactor solution. Suitable deactivators are well known in the art, non-limiting examples include: amines (e.g., U.S. Pat. No. 4,803,259 to Zboril et al.); alkali or alkaline earth metal salts of carboxylic acid (e.g., U.S. Pat. No. 4,105,609 to Machan et al.); water (e.g., U.S. Pat. No. 4,731,438 to Bernier et al.); hydrotalcites, alcohols and carboxylic acids (e.g., U.S. Pat. No. 4,379,882 to Miyata); or a combination thereof (U.S. Pat. No. 6,180,730 to Sibtain et al.). The catalyst deactivator is added in a minimal amount such that the catalyst is deactivated and the polymerization reaction is quenched.

The deactivated solution is then passivated, forming a passivated solution, by adding an acid scavenger. Suitable passivators are well known in the art, non-limiting examples include alkali or alkaline earth metal salts of carboxylic acids or hydrotalcites. In general, the passivator is added in the minimal amount to substantially passivate the deactivated solution.

Once passivated, the polymer solution is forwarded to polymer recovery operations. Polymer recovery operations include: a series of vapor/liquid separators to separate solvent, ethylene, comonomer(s) and hydrogen from the heterogeneous ethylene interpolymer; followed by one or more gear pump, or single screw extruder or twin screw extruder to force the molten interpolymer product through a pelletizer, and; once pelletized the solidified interpolymer is typically dried and transferred to a storage silo.

Type II Heterogeneous Ethylene Interpolymer

In this disclosure, Type II heterogeneous ethylene interpolymers have a short chain branching Distribution Profile Index, $DPI^{SCB}$, that satisfies formula (I).

$$-1 \leq DPI^{SCB} \leq 1 \qquad (I)$$

The upper limit on the density of the Type II heterogeneous ethylene interpolymer may be about 0.942 g/cm$^3$; in some cases about 0.940 g/cm$^3$ and; in other cases about 0.938 g/cm$^3$; while the lower density limit may be about 0.911 g/cm$^3$, in some cases about 0.913 g/cm$^3$, and; in other cases about 0.915 g/cm$^3$.

The upper limit on the mole % of α-olefin comonomer, or comonomers, in the Type II heterogeneous ethylene interpolymer may be about 6%, in other cases about 5% and in still other cases about 4%; while the lower limit on the mole % of α-olefin comonomer, or comonomers, may be about 0.2%, in other cases about 0.4% and in still other cases about 0.6%.

The upper limit on the CDBI$_{50}$ of the Type II heterogeneous ethylene interpolymer may be about 85%, in other cases about 80% and in still other cases about 75%; while the lower limit on CDBI$_{50}$ may be about 45%, in other cases about 50% and in still other cases about 55%.

The upper limit on the Mw/Mn of the ethylene interpolymer product may be about 6.0, in other cases about 5.5 and in still other cases about 5.0. The lower limit on the Mw/Mn of the ethylene interpolymer product may be 2.5, in other cases about 2.7 and in still other cases about 3.0.

The upper limit on melt index of the Type II heterogeneous ethylene interpolymer may be about 3.5 dg/min, in some cases about 2.5 dg/min; in other cases about 1.5 dg/min, and; in still other cases about 1.0 dg/min. The lower limit on the melt index of the ethylene interpolymer product may be about 0.3 dg/min, in some cases about 0.4 dg/min; in other cases about 0.5 dg/min, and; in still other cases about 0.6 dg/min.

The upper limit on the ppm of metal M, that originates from component (iii), contained within the Type II heterogeneous ethylene interpolymer may be about 12 ppm, in other cases about 9 ppm and in still other cases about 7; while the lower limit on the ppm of metal M, that originates from component (iii), may be about 0.2 ppm, in other cases about 0.5 ppm and in still other cases about 1 ppm.

Manufactured Articles

The heterogeneous ethylene interpolymers disclosed herein may be converted into flexible manufactured articles such as monolayer or multilayer films. Such films are well known to those with ordinary experience in the art; non-limiting examples of processes to prepare such films include blown film processes and cast film processes.

Depending on the end-use application, the disclosed heterogeneous ethylene interpolymers may be converted into films that span a wide range of thicknesses. Non-limiting examples include, packaging films where thicknesses may range from about 0.5 mil (13 μm) to about 4 mil (102 μm), and; heavy duty film applications where thickness may range from about 2 mil (51 μm) to about 10 mil (254 μm).

The heterogeneous ethylene interpolymers disclosed herein may be used in monolayer films; where the monolayer may contain more than one heterogeneous ethylene interpolymer and/or additional thermoplastics and/or additives. The lower limit on the weight percent of the heterogeneous ethylene interpolymer in a monolayer film may be about 3 wt %, in other cases about 10 wt % and in still other cases about 30 wt %. The upper limit on the weight percent of the heterogeneous ethylene interpolymer in the monolayer film may be 100 wt %, in other cases about 90 wt % and in still other cases about 70 wt %.

The heterogeneous ethylene interpolymer disclosed herein may also be used in one or more layers of a multilayer film; non-limiting examples of multilayer films include two, three, five, seven, nine, eleven or more layers. In some embodiments, the thickness of a specific layer (containing the heterogeneous ethylene interpolymers disclosed herein) within a multilayer film may be about 5%, in other cases about 15% and in still other cases about 30% of the total multilayer film thickness. In other embodiments, the thickness of a specific layer (containing the heterogeneous ethylene interpolymers disclosed herein) within a multilayer film may be about 95%, in other cases about 80% and in still other cases about 65% of the total multilayer film thickness. One or more layers of a multilayer film may contain more than one of the heterogeneous ethylene interpolymers disclosed herein, as well as other thermoplastics and/or additional additives.

The heterogeneous ethylene interpolymers disclosed herein are well suited for use in conventional shrink film applications as well as specialized shrink film applications; optionally, the heterogeneous interpolymers disclosed herein may be blended with other ethylene polymers, non-limiting examples included plastomers, very-low density polyethylene (VLDPE), linear-low density polyethylene (LLDPE), medium density polyethylene (MDPE), high density polyethylene (HDPE), high pressure low density polyethylene (LDPE) and copolymers of ethylene and vinyl acetate (EVA). The heterogeneous ethylene interpolymers disclosed herein can be used in a wide range of manufactured articles comprising one or more films (monolayer or multilayer). Non-limiting examples of such manufactured articles include: collation shrink film, pallet shrink film, shrink bags and shrink bundling; industrial and institutional films, magazine overwrap, newspaper bags and mail bags; heavy-duty sacks; construction films and sheeting, and; food packaging films.

Desired film physical properties (monolayer or multilayer) typically depend on the application of interest. In the case of shrink films, desired film properties include one or more of: the desired film shrinkage (%) in the machine and/or transverse direction, the desired film holding force, machine direction shrink tunnel shrink force of at least 1.75 kg, acceptable film tensile strength (after shrinkage), acceptable load retention, acceptable film stiffness, acceptable film puncture resistance and/or toughness, acceptable film optical properties and acceptable film sealing properties. Film optical properties such as low haze, high gloss and high clarity may (or may not) be important depending on the application, e.g. low haze, high gloss and high clarity are typically desired if the product (e.g. can or bottle) must be clearly visible though the shrink wrap film. Low haze, high gloss and high clarity are also desired if shrink film is printed, i.e. the printed image functions as a product advertisement.

The films used in the manufactured articles described in this section may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

Testing Procedures

Prior to testing, specimens were conditioned for at least 24 hours at 23±2° C. and 50±10% relative humidity and, unless indicated otherwise, testing was conducted at 23±2° C. and 50±10% relative humidity.

Density

Heterogeneous ethylene interpolymer densities were determined using ASTM D792-13 (Nov. 1, 2013).

Melt Index

Heterogeneous ethylene interpolymer melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship:

$$S.Ex.=\log(I_6/I_2)/\log(6480/2160)$$

where $I_6$ and $I_2$ are the melt flow rates measured at 190° C. using 6.48 kg and 2.16 kg loads, respectively.

Differential Scanning calorimetry (DSC)

The primary melting peak or "Tm" (° C.), heat of fusion (J/g) and crystallinity (%) were determined using a Differential Scanning calorimeter (DSC), i.e. a TA Instruments DSC Q1000 Thermal Analyser with MDSC® 2.40 and Controller with Universal Analysis 2000 for Windows 95/98/2000/NT Version 3.1E software. The DSC was first calibrated with indium. After calibration, a small sample (5 to 10 mg) of heterogeneous ethylene interpolymer specimen was placed in an aluminum pan, lidded, crimped and placed in the DSC. The sample was equilibrated at 0° C. and then the temperature was increased to 200° C. at a heating rate of 10° C./min; the melt was then kept at 200° C. for five minutes; the melt was then cooled to 0° C. at a cooling rate of 10° C./min and kept at 0° C. for five minutes; the specimen was then heated to 200° C. at a heating rate of 10° C./min. The Tm, heat of fusion and crystallinity were reported from the 2nd heating cycle.

Comonomer Content

The type of comonomer (1-hexene or 1-octene) and quantity of comonomer (branches per 1000C and mole % comonomer) in a heterogeneous ethylene interpolymer was determined according to ASTM D6645-01 (January 2010).

Gel Permeation Chromatographs (GPC)

Gel Permeation Chromatography (GPC) data was generated according to ASTM D6474 (Dec. 15, 2010), using a Waters 150C GPC and the solvent used was 1,2,4-trichlorobenzene (TCB). The TCB also contained 250 ppm of antioxidant (2,6-di-tert-butyl-4-methylphenol, (BHT)) to stabilize the polymer. GPC analysis produced the following molecular weight averages: Mn (number average), Mw (weight average) and Mz (z-average)) of an ethylene polymer; as described in ASTM D6474 (December 2012). Depending on context, the polydispersity, or molecular weight distribution, of a heterogeneous ethylene interpolymer may be expressed in terms of the Mw/Mn or the Mz/Mw ratios.

GPC-FTIR

A GPC-FTIR unit was used to generate the $SCB_{Log(M1)}$ and $SCB_{Log(M2)}$ data required to calculate "$DPI^{SCB}$", see formula (I) and (II). A heterogeneous ethylene interpolymer sample was placed in a sample vial and 1,2,4-trichlorobenzene (TCB) was added; concentrations of about 2 to about 4 mg of interpolymer per mL of TCB are suitable. The interpolymer sample was dissolved in the TCB, i.e. the sample vial was placed on a rotating wheel within an oven maintained at 150° C. and rotated for 4 hours. The TCB also contained 250 ppm of BHT to stabilize the polymer against oxidative degradation. Interpolymer solutions were chromatographed at 140° C. on a Waters GPC 150C chromatography unit equipped with four Shodex columns (HT803, HT804, HT805 and HT806), TCB containing 250 ppm of BHT was used as the mobile phase. The Water 150C was programmed as follows: Sample Injection Volume, 300 µL; TCB Flow Rate, 1.0 mL/min; Run Time, 25 or 50 min; Injector Compartment, Time 0 min, Low Temp 140° C., High Temp 140° C.; Column Compartment, Time 0 min, Low Temp 140° C., High Temp 140° C.; Pump/Solvent Compartment: Time 0 min, Low Temp 50° C., High Temp 50° C.; Heat Transfer Line and FTIR Detector Temp 140° C. The GPC columns were calibrated with narrow distribution polystyrene standards; the polystyrene molecular weights were converted to polyethylene molecular weights using the Mark-Houwink equation according to ASTM D6474. A Nicolet Magna 750 FTIR spectrometer equipped with a heated FTIR flow through cell (70 µL) was used as the detection system. A heated transfer line (140° C.) was used to transfer the GPC effluent into the FTIR flow through cell. FTIR spectra were acquired in the absorbance mode. The methylene C—H stretch band from 2920 cm$^{-1}$ to 2932 cm$^{-1}$ was used to determine the interpolymer concentration, and; the methyl C—H stretch band from 2955 cm$^{-1}$ to 2968 cm$^{-1}$ was used to determine the total number of methyl groups in the interpolymer. The methyl/methylene absorption ratio was used to calculate the amount of short chain branching (SCB/1000C) in the portion of interpolymer eluting from the GPC column at a specific elution time (run time). Raw FTIR spectra were processed with OPUS FTIR software and the interpolymer concentration and methyl content in each elution volume (fraction, or slice of the GPC chromatogram) was calculated in real time with the Chemometric Software (PLS technique (Partial Least Squares)) associated with the OPUS software. The interpolymer concentration and methyl content were then baseline-corrected with the Cirrus GPC software. The FTIR detector was calibrated using ethylene polymer standards of known branch content and the short chain branching (SCB/1000C) of each fraction of the interpolymer sample was predicted using a PLS technique as described in Paul J. DesLauriers, Polymer 43, pages 159-170 (2002); herein incorporated by reference. The GPC-FTIR method measures total methyl content, which includes the methyl groups located at the ends of each macromolecular chain, i.e. methyl end groups. Thus, the raw GPC-FTIR data must be corrected by subtracting the contribution from methyl end groups. To be more clear, the raw GPC-FTIR data overestimates the amount of short chain branching (SCB) and this overestimation increases as molecular weight (M) decreases; i.e. as macromolecular chains get shorter (the methyl/methylene absorption ratio increases (at constant SCB)). In this disclosure, raw GPC-FTIR data was corrected using the 2-methyl correction, and "2-Methyl Corrected"

data is plotted in FIGS. 1-3. At a given molecular weight (M), the number of methyl end groups ($N_E$) was calculated using the following equation; $N_E$=2800/M, and $N_E$ (M dependent) was subtracted from the raw GPC-FTIR data to produce the SCB/1000C (2-Methyl Corrected) GPC-FTIR data shown in FIGS. 1-3. As shown in Table 1, $SCB_{Log(M2)}$ is the amount of short chain branching (2-Methyl Corrected) in the interpolymer eluting from the GPC column at Log (M1)=4.35, i.e. M1=22,387; and $SCB_{Log(M2)}$ is the amount of short chain branching (2-Methyl Corrected) in the interpolymer eluting from the GPC column at Log(M2)=5, i.e. M2=100,000.

C-TREF

The chemical composition distribution of heterogeneous ethylene interpolymers disclosed herein was measured using a CRYSTAF/TREF 200+ unit equipped with an IR detector, hereafter the C-TREF. The C-TREF was supplied by PolymerChAR S.A. (Valencia Technology Park, Gustave Eiffel, 8, Paterna, E-46980 Valencia, Spain). The C-TREF was operated in the TREF mode, which generates the weight fraction of the interpolymer sample as a function of elution temperature from which the Co/Ho ratio (Copolymer/Homopolymer ratio) and the CDBI (the Composition Distribution Breadth Index), i.e. $CDBI_{50}$ and $CDBI_{25}$ can be calculated. An interpolymer sample (80 to 100 mg) was placed into the reactor vessel of the C-TREF. The reactor vessel was filled with 35 ml of 1,2,4-trichlorobenzene (TCB) and the interpolymer was dissolved by heating the solution to 150° C. for 2 hours. An aliquot (1.5 mL) of the solution was then loaded into the C-TREF column which was packed with stainless steel beads. The column, loaded with sample, was allowed to stabilize at 110° C. for 45 minutes. The interpolymer was then crystallized from solution, within the column, by dropping the temperature to 30° C. at a cooling rate of 0.09° C./minute. The column was then equilibrated for 30 minutes at 30° C. The crystallized interpolymer was then eluted from the column with TCB flowing through the column at 0.75 mL/minute, while the column was slowly heated from 30° C. to 110° C. at a heating rate of 0.25° C./minute. The raw C-TREF data were processed using Polymer ChAR software, an Excel spreadsheet and C-TREF software developed in-house. $CDBI_{50}$ was defined as the percent of interpolymer whose composition is within 50% of the median comonomer composition; $CDBI_{50}$ was calculated from the composition distribution cure and the normalized cumulative integral of the composition distribution curve, as described in U.S. Pat. No. 5,376,439. $CDBI_{25}$ as calculated in a similar manner; $CDBI_{25}$ is defined as the percent of interpolymer whose composition is with 25% of the median comonomer composition. At the end of each sample run, the C-TREF column was cleaned for 30 minutes; specifically, with the C-TREF column temperature at 160° C., TCB flowed (0.5 mL/minute) through the column for 30 minutes.

Shrink Tunnel Test

The machine direction shrink tunnel shrink force of films containing heterogeneous ethylene interpolymers was determined as described in this section. In this disclosure the shrink tunnel employed was a Shanklin Shrink tunnel, model T71 (Shanklin Corporation, 100 Westford Road, Ayer, Mass. 01432, U.S.A.). The type of shrink tunnel is not particularly important with respect to this disclosure. The Shanklin model T71 was a commercial sized shrink tunnel equipped with a single chamber hot air oven (10 inch high, 22 inch wide and 60 inch long) with a conveyor running through the oven. The shrink tunnel was fitted with finstrip heating elements and a Leeson blower motor (1.5 H.P., 3-phase); by adjusting shrink tunnel baffles the air velocity in the oven can be controlled, or the intensity of the heat in the oven. In this disclosure, the shrink tunnel oven was operated with all baffles open. The shrink tunnel temperature was adjustable from room temperature to 500° F. (260° C.). In this disclosure, the shrink tunnel was consistently operated at 400° F. (204.4° C.) and the machine direction shrink tunnel shrink force of monolayer shrink film samples were measured as a function of conveyor speed. The composite-link conveyor belt was controlled by a variable speed Leeson motor (180V, 2.5 amp); conveyor speeds were adjustable from about 16 to about 123 feet/min which was equivalent to sample oven times from about 19 seconds to about 2.4 seconds. Upon exiting the oven, the shrink film sample passes through an annealing/cooling chamber; the annealing/cooling chamber was simply an extension of the oven equipped with a cooling fan circulating ambient laboratory air.

Five film specimens were prepared from a roll of monolayer blown film as follows: a 3 foot length of film was unwound from a roll of tubular blown film and placed on a cutting surface such that the outside surface of the tubular film (outside surface of the original film roll) was facing up and the leading edge of the film roll is located at the bottom edge of the cutting surface; a rectangular cutting template (29 inch by 3 inch) was placed on top of the tubular film sample approximately 1 inch from the bottom edge of the sample, with the long dimension (29 inch) oriented parallel with the machine direction of the film; the film sample was cut along the outer edge defined by the cutting template; the top layer of film was used as a film sample, i.e. cutting tubular blown film produced a top and a bottom film sample (the bottom film sample was discarded); using a felt marker an alignment line 3.25 inches from the bottom edge of the film sample was drawn on the film sample using the slot provided in the template (this line was parallel with the transverse direction); this procedure was repeated five times to obtain five 29 inch×3 inch film samples to determine the machine direction shrink tunnel shrink force of a specific film.

The following paragraph describes the "testing device" and "testing fixture" used in the shrink tunnel test. As shown in FIG. 7a, place a bakery scale 102 on the upper platform of a (6 inch×6 inch) laboratory scissor jack 101 and place an aluminum scale plate 103 (7.625 inch×6 inch×0.2 inch thick) on top of the bakery scale. The term "testing device" defines the combination of the scale plate, the bakery scale and the scissor jack, as shown in FIG. 7a. The scale used was a conventional spring balance scale that measures force (kg), or weight, by balancing the force due to gravity against the force on a spring. The scale was purchased from Salter (2311 W. 22$^{nd}$ Street, Suite 200, Oak Brook Ill., 60523 U.S.A.); specifically, Salter Model 1038, weight capacity 11 lb (5 kg) in increments of 0.1 oz (1 g). The scale plate ensures that a film sample does not make contact with the sides of the bakery scale; in addition, the two edges of the scale plate that make contact with the film sample are folded downward forming a smooth rounded edge. Manually adjust the height of the scissor jack such that the top surface of the scale plate is 5.75 inch from the table surface upon which the scissor jacket is resting. Manually place the testing device on top of a film sample (29 inch×3 inch) such that the long dimension of the film sample is oriented perpendicular to the height adjustment knob on the scissor jack (see FIG. 7b). Wrap the two ends of the film sample around the testing device, align one end of the film sample with the 3.25 inch alignment line on the other end of the film sample and using adhesive tape secure the two ends of the film sample together forming a tubular film sample mounted on the testing device; rotate the tubular film sample such that the taped region is located underneath the scissor jack's bottom plate; ensure that the tubular film sample is located in the center of the scale plate; zero the scale; using the scissor jack height adjustment knob, raise the scissor jack until the scale reads 300 g. Hereafter, the term "testing fixture" is used to describe the combination of the tubular film sample, the scale plate, the bakery scale and the scissor jack; as shown in FIG. 7b. Manually lift the testing fixture off the table and place it back on the table until the scale remains at 200 g±10%; this ensures that any slack or misalignment in the tubular film sample is removed. Using the scissor jack adjusting knob, lower the scale plate height to 5.75 inch from the table surface and the scale reads 0 g.

As shown in FIG. 8, the testing fixture was placed on the conveyor belt 201 and the testing fixture passed through the shrink oven 202. Conveyor speeds of 30 40, 50, 60 and 70 ft/min were used; five samples of each of the monolayer films shown in Table 4 were tested at each conveyor speed, and; the shrink oven temperature was held consistent at 400° F. (204.4° C.). After exiting the shrink tunnel, manually transport the testing fixture to a table and monitor the force reading on the bakery scale until there is no further change in reading; record the machine direction shrink tunnel shrink force as displayed on the digital readout of the bakery scale in kg. Using scissors cut the shrunken film sample from the testing fixture and measure the % TD shrink using the following formula: % TD shrink=100×($W^f$−W°)/W°; where W° is the original film width (in the TD direction) and $W^f$ if the final film width (in the TD direction) measured at the point of minimal width after shrinkage. FIG. 7c illustrates the point of minimal width 106 that was used to calculate the % TD shrink.

Film Puncture

Film puncture, the energy (J/mm) required to break the film was determined using ASTM D5748-95 (originally adopted in 1995, reapproved in 2012).

Film Modulus

In this disclosure, film secant modulus was measured as follows. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relationship of polyethylene does not follow Hook's law; i.e. the stress-strain behavior of polyethylene is non-linear due to its viscoelastic nature. Secant moduli were measured using a conventional Instron tensile tester equipped with a 200 lbf load cell. Film samples, for film modulus testing, had the following dimensions: 14 inch long, 1 inch wide and 1 mil thick; ensuring that there were no nicks or cuts on the edges of the samples. Film samples were cut in both the machine direction (MD) and the transverse direction (TD) and tested. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% and 2% secant modulus were calculated using the Instron software.

Film Dart Impact

Film dart impact strength was determined using ASTM D1709-09 Method A (May 1, 2009). In this disclosure the dart impact test employed a 1.5 inch (38 mm) diameter hemispherical headed dart.

Film Tensile

The following film tensile properties were determined using ASTM D882-12 (Aug. 1, 2012): tensile break strength (MPa), elongation at break (%), tensile yield strength (MPa), tensile elongation at yield (%) and film toughness or total energy to break (ft·lb/in$^3$). Tensile properties were measured in the both the machine direction (MD) and the transverse direction (TD) of the blown films.

Film Tear

Film tear performance was determined by ASTM D1922-09 (May 1, 2009); an equivalent term for tear is "Elmendorf tear". Film tear was measured in both the machine direction (MD) and the transverse direction (TD) of the blown films.

EXAMPLES

Polymerization

Embodiments of ethylene interpolymers having a Type II short chain branching distribution profile index ($DPI^{SCB}$) were prepared in a continuous solution polymerization pilot plant. The following examples are presented for the purpose of illustrating selected embodiments of this disclosure; it being understood, that the examples presented do not limit the claims presented.

Methylpentane was used as the process solvent (a commercial blend of methylpentane isomers). The volume of the Reactor 1 (R1), a CSTR reactor, was 5.8 gallons (22 L) and the volume of Reactor 2 (R2), a tubular reactor, was 4.3 gallons (16 L).

The process conditions used to produce Example 6 and Example 9 are shown in Table 2. R1 was maintained at a pressure of about 16 MPa and R2 was operated at a lower pressure to facilitate continuous flow from R1 to R2. R1 and R2 were operated in series mode, i.e. the process stream exiting R1 flows directly into R2. R1 was agitated at 500 rpm such that reactor contents were well mixed. The process was operated continuously: fresh process solvent, ethylene, 1-octene, hydrogen and in-line Ziegler-Natta catalyst were fed to R1, and; fresh ethylene and hydrogen were fed to R2.

The in-line Ziegler-Natta catalyst was prepared from the following components: component (i), butyl ethyl magnesium; component (ii), tertiary butyl chloride; component (iii), titanium tetrachloride; component (iv), diethyl aluminum ethoxide, and; component (v), triethyl aluminum. Methylpentane was used as the catalyst component solvent. For Examples 6 and 9 shown in Table 2, the in-line Ziegler-Natta catalyst was prepared as follows. In step (1), a solution of triethylaluminum and dibutylmagnesium, [(triethylaluminum)/(dibutylmagnesium)] molar ratio of 20, was combined with a solution of tertiary butyl chloride and allowed to react for about 30 seconds (HUT-1); in step (2), a solution of titanium tetrachloride was added to the mixture formed in step one and allowed to react for about 14 seconds (HUT-2), and; in step (3), the mixture formed in step (2) was allowed to reactor for an additional 3 seconds (HUT-3) prior to injection of the in-line Ziegler Natta procatalyst into R1. 100% of component (iv) was injected directly into R1, forming the in-line Ziegler-Natta catalyst. The quantity of titanium tetrachloride "R1 component (iii) (ppm)" added to reactor 1 (R1) is shown in Table 2; to be clear, in Example 6 the solution in R1 contained 4.0 ppm of TiCl$_4$. The mole ratios of the in-line Ziegler-Natta catalyst components are also shown in Table 2, specifically: [component (ii)/component (i)]; [component (iv)/component (iii)], and; [component (v)/component (iii)]. To be clear, in Example 6, the following mole ratios were used to synthesize the in-line Ziegler-Natta catalyst: R1 [component (ii)/component (i)]=2.04; R1 [component (iv)/component (iii)]=1.35, and; R1 [component (v)/component (iii)]=0.35. Referring to FIG. 6, 100% of component (iv) was added to reactor 11 via stream 10.

Average residence time of the solvent in a reactor is primarily influenced by the amount of solvent flowing through each reactor and the total amount of solvent flowing through the solution process, the following are representative or typical values for the examples shown in Table 2: about 73 seconds in R1 and about 50 seconds for an R2.

Polymerization in the continuous solution polymerization process was terminated by adding a catalyst deactivator to the stream exiting R2. The catalyst deactivator used was octanoic acid (caprylic acid), commercially available from P&G Chemicals, Cincinnati, Ohio, U.S.A. The catalyst deactivator was added such that the moles of fatty acid added were 50% of the total molar amount of titanium and aluminum added to the polymerization process; to be clear, the moles of octanoic acid added=0.5×(moles titanium+ moles aluminum).

A two-stage devolitizing process was employed to recover the heterogeneous ethylene interpolymer from the process solvent, i.e. two vapor/liquid separators were used and the second bottom stream (from the second V/L separator) was passed through a gear pump/pelletizer combination. DHT-4V (hydrotalcite), supplied by Kyowa Chemical Industry Co. LTD, Tokyo, Japan was used as a passivator, or acid scavenger, in the continuous solution process. A slurry of DHT-4V in process solvent was added prior to the first V/L separator. The molar amount of DHT-4V added was 10-fold higher than the molar amount of tertiary butyl chloride added.

Prior to pelletization the heterogeneous ethylene interpolymer product was stabilized by adding 550 ppm of Irganox 1076 (a primary antioxidant) and 550 ppm of Irgafos 168 (a secondary antioxidant), based on weight of the total weight of the interpolymer produced. Antioxidants were dissolved in process solvent and added between the first and second V/L separators.

For both Example 6 and 9, the ethylene feed was portioned between the two reactors as follows: 80% to R1 ($ES^{R1}$=80%), and; 20% to R2 ($ES^{R2}$=20%). For both Examples 6 and 9, the 1-octene feed was portioned between the two reactors as follows: 100% to R1 ($OS^{R1}$=100%), and; 0% to R2 ($OS^{R2}$=0%). Additional process conditions such as reactor temperatures and ethylene conversion are shown in Table 2.

Heterogeneous Ethylene Interpolymer Characterization

Heterogeneous ethylene interpolymer Examples 6 and 9 where characterized analytically and the results are compared with a conventional gas phase product, Comparative G-A6, in Table 3. The C-TREF data disclosed includes the $CDBI_{50}$, CDBI25, Co/Ho ratio, High Elution Peak temperature and Low Elution peak temperature. As shown in FIG. 4, the C-TREF curve of Example 6 shows two distinct peaks eluting at 87.9 and 94.2° C.; multiple C-TREF peaks are a characteristic of heterogeneous ethylene interpolymers. Similarly, Comparative G-A6 produced in a gas phase process using a heterogeneous catalyst system has two C-TREF peaks eluting at 87.0 and 95.9° C., as shown in FIG. 5.

Example 6 was subjected to GPC-FTIR analysis and the results are shown in FIG. 1. The GPC-FTIR generated SCB/1000C data (the dotted line) is pseudo flat across the entire molecular weight distribution (the solid bell-shaped curve). Example 6 has a Type II pseudo-flat comonomer distribution profile with a $DPI^{SCB}$ value of −0.250 SCB/1000C. Table 1 shows the $SCB_{Log(M1)}$ and $SCB_{Log(M2)}$ values extracted from FIG. 1 that were used to calculate $DPI^{SCB}$, i.e.: ($DPI^{SCB}=SCB_{Log(M1)}-SCB_{Log(M2)}$). Similarly, as shown in FIG. 2 and Table 1, Example 9 has a Type II pseudo-flat comonomer distribution profile with a $DPI^{SCB}$ value of −0.290 SCB/1000C.

In contrast, Comparative G-A6 has a GPC-FTIR curve as shown in FIG. 3. In Comparative G-A6 the amount of short chain branching (the dotted line) decreases rapidly as molecular weight increases (the solid bell-shaped curve). Comparative G-A6 is a conventional heterogeneous ethylene interpolymer produced with a batch Ziegler-Natta catalyst and characterized as having a Type IV short chain branching Distribution Profile Index, i.e. $DPI^{SCB}$>1. Comparative G-A6 has a $DPI^{SCB}$ value of 1.64. The values of $SCB_{Log(M1)}$ and $SCB_{Log(M2)}$ used to calculate the $DPI^{SCB}$ of Comparative G-A6 are shown in Table 1.

Type IV $DPI^{SCB}$ is a characteristic of conventional Ziegler-Natta heterogeneous ethylene interpolymers as shown by the twelve Comparative samples shown in Table 1. These comparatives include heterogeneous ethylene interpolymers produced using a batch Ziegler-Natta catalyst (or procatalyst) in a comparative solution process or a batch Ziegler catalysts (or procatalysts) in comparative gas phase processes. In contrast, Examples 1 through 9 disclosed herein, are heterogeneous ethylene interpolymers having a Type II short chain branching Distribution Profile Index (−1≤$DPI^{SCB}$≤1) and were produced using an in-line Ziegler-Natta catalyst (or procatalyst) using NOVA Chemicals' Advanced SCLAIRTECH™ solution process.

Monolayer Films

Example 6, Example 9 and Comparative G-A6 were blended with LDPE and the resulting blends, fully described in Table 4, were converted into monolayer blown films; each film was labeled with the unique "Film Code" shown in the left most column of Table 4. Based on LDPE content, these films can be grouped into two categories, i.e. films coded with the "Fa" suffix are LDPE rich (60 wt %) and films coded with the "Fb" suffix are LDPE lean (30 wt %).

Monolayer blown films were produced on a Gloucester extruder, 2.5 inch (6.45 cm) barrel diameter, 24/1 L/D (barrel Length/barrel Diameter) equipped with: a barrier screw; a high pressure 3 inch (7.62 cm) diameter die with a 35 mil (0.089 cm) die gap, and; a Western Polymer Air ring. Blown film, of about 2.4 mil (61 μm) thick, was produced at a constant output rate of 100 lb/hr (45.4 kg/hr) by adjusting extruder screw speed, and; the frost line height was maintained at 18 inch (45.7 cm) by adjusting the cooling air. Blown film processing conditions are disclosed in Tables 5a and 5b.

The physical properties of blown films are disclosed in Tables 6a through 6d. Table 6a compares film puncture and film secant moduli of LDPE rich (60 wt % LDPE) films. FIG. 9*a* shows the advantage of using Type II heterogeneous ethylene interpolymers in LDPE rich blends; relative to conventional Type IV heterogeneous ethylene interpolymers. To be more clear, as shown in FIG. 9*a*, the film puncture strength of Example 9-Fa is 32% higher (29 J/mm) relative to Comparative G-A6-Fa (22 J/mm); at constant film modulus of 270 MPa (1% secant modulus). The film puncture strength of Example 6-Fa is 41% higher (31 J/mm) relative to Comparative G-A6-Fa (22 J/mm); the 1% secant modulus of Example 6-Fa was 8% lower relative to the modulus of Comparative G-A6-Fa, i.e. 249 MPa relative to 270 MPa, respectively.

Figure 9B:
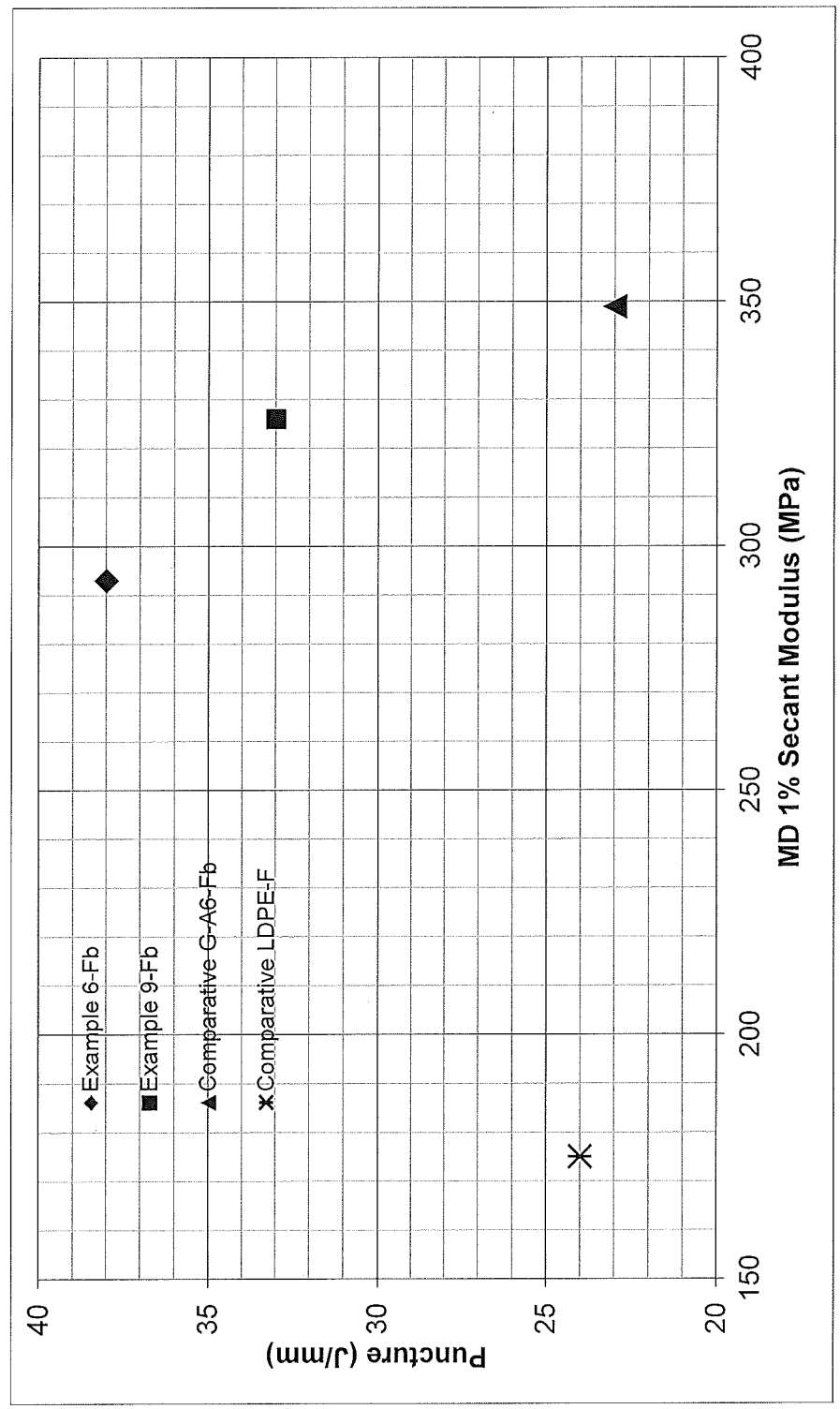
FIG. 9b, film puncture strength (J/mm) as a function of film modulus (machine direction 1% secant modulus (MPa)) for monolayer films Example 6-Fb, Example 9-Fb and Comparative G-A6-Fb containing 30 weight % LDPE, and; a monolayer film Comparative LDPE-F containing 100% LDPE.

Table 6b compares film puncture and film secant moduli of LDPE lean (30 wt % LDPE) films. Comparing FIGS. 9a and 9b, the higher modulus of the LDPE lean films are evident. Similar to FIG. 9a; FIG. 9b shows the advantage of using a Type II heterogeneous ethylene interpolymer in LDPE lean blends; relative to conventional Type IV heterogeneous ethylene interpolymers. To be more clear, as shown in FIG. 9b, the film puncture strength of Example 9-Fb is 38% higher (33 J/mm) relative to Comparative G-A6-Fa (24 J/mm); at approximately constant film moduli of 326 and 349 MPa, respectively (these moduli differ by 6.6%). The film puncture strength of Example 6-Fb is 65% higher (38 J/mm) relative to Comparative G-A6-Fa (23 J/mm); the 1% secant modulus of Example 6-Fb was 16% lower relative to the modulus of Comparative G-A6-Fb, i.e. 293 MPa relative to 349 MPa, respectively.

The performance of the monolayer films in collation shrink film applications was evaluated using a shrink tunnel test. The shrink tunnel test was thoroughly described in the Testing Procedures section of this disclosure. In brief: a testing device (FIG. 7a) is wrapped with a tubular sample of film forming a testing fixture (FIG. 7b); the testing fixture is passed through a shrink tunnel; shrinkage of the film sample exerts a force on a bakery scale (a component of the texting fixture), and; the machine direction shrink tunnel shrink force (kg) is displayed on the digital readout on the bakery scale (FIG. 7c and FIG. 8). In this disclosure, the machine direction shrink tunnel shrink force was measured at shrink tunnel conveyor speeds of 30, 40, 50, 60 and 70 ft/min and the shrink oven temperature was held constant at 400° F. (204.4° C.).

Figure 10A:
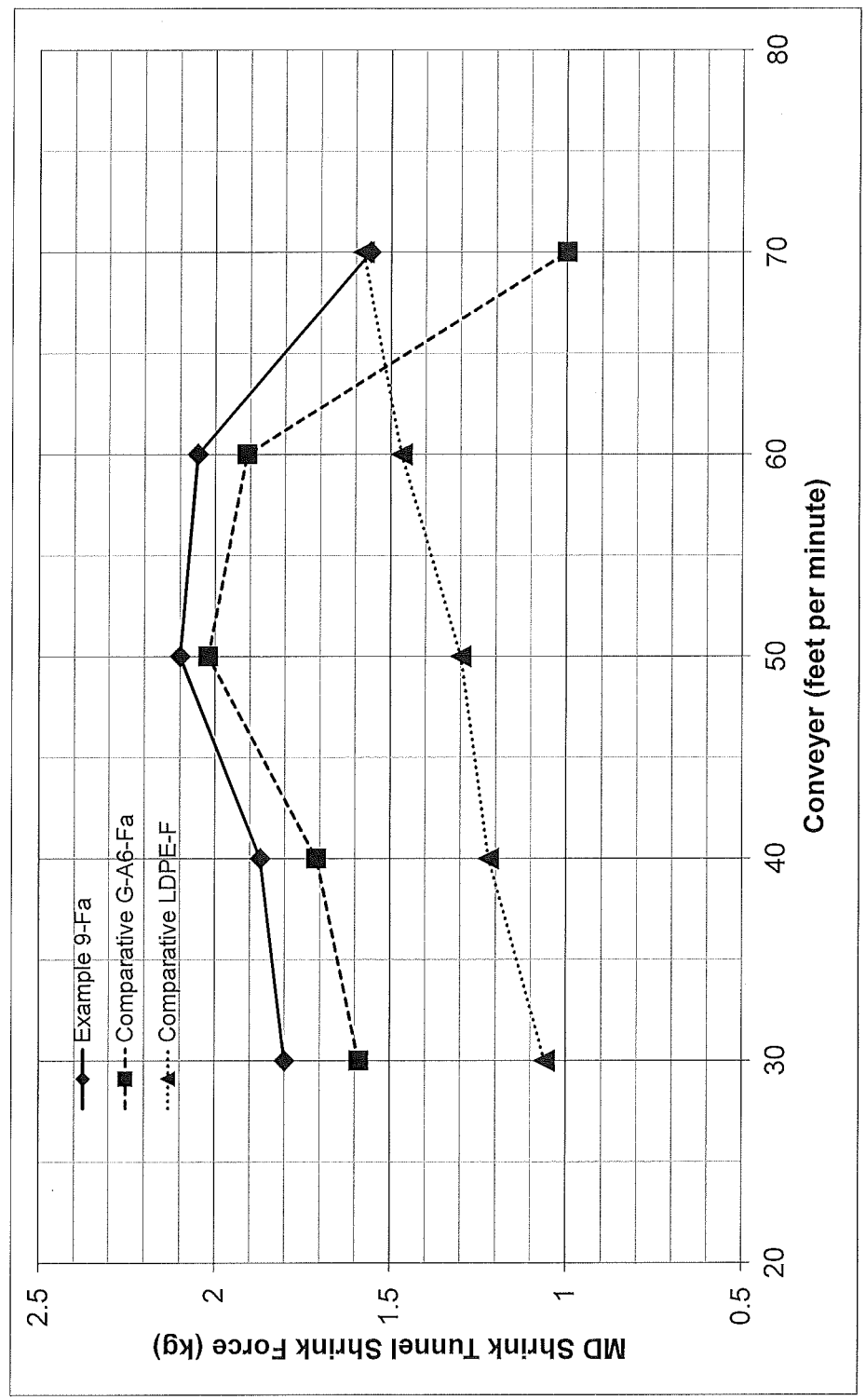
FIG. 10a, machine direction shrink tunnel shrink force (kg) as a function of conveyor speed (ft/min) for monolayer films Example 9-Fa and Comparative G-A6-Fa containing 60 weight % LDPE, and; monolayer film Comparative LDPE-F containing 100% LDPE.

Shrink tunnel test results are shown in FIG. 10a for the following monolayer films: Example 9-Fa, Comparative G-A6-Fa and Comparative LDPE-F. Comparing the two LDPE rich (60 wt % LDPE) blends; Example 9-Fa has consistently higher machine direction shrink tunnel shrink force, relative to Comparative G-A6-Fa. FIG. 10a shows the advantage of using Type II $DPI^{SCB}$ ($-1 \leq DPI^{SCB} \leq 1$) heterogeneous ethylene interpolymers in LDPE rich blends in collation shrink film applications; relative to conventional Type IV ($DPI^{SCB} > 1.0$) heterogeneous ethylene interpolymers. The shrink tunnel test data shown in FIG. 10a was reproduced in tabular form in Table 7a. Experience has shown that films having a machine direction shrink tunnel shrink force ≥1.75 kg perform well in commercial collation shrink applications; thus in Table 7a, force values ≥1.75 kg were labeled with the superscript "P" for Pass, while force values <1.75 kg were labeled with the superscript "F" for Fail. The right most column of Table 7 shows that at conveyor speeds from 30 to 60 ft/min LDPE rich shrink films comprising a Type II ($-1 \leq DPI^{SCB} \leq 1$) heterogeneous ethylene interpolymers have about 8.0% higher MD shrink tunnel shrink force, relative to a film of similar chemical composition but the heterogeneous ethylene interpolymer is Type IV ($DPI^{SCB} > 1.0$).

Figure 10B:
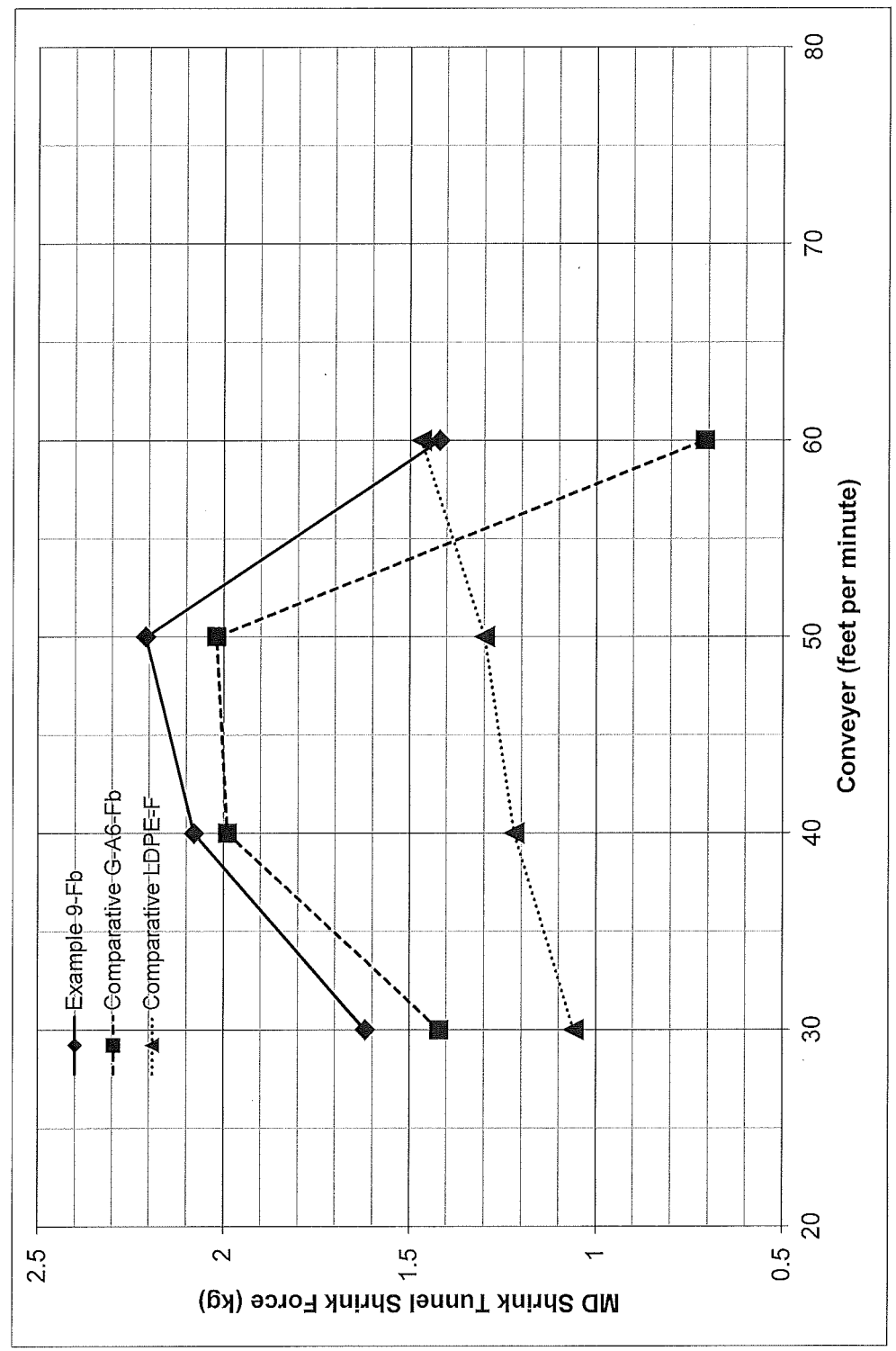
FIG. 10b, machine direction shrink tunnel shrink force (kg) as a function of conveyor speed (ft/min) for monolayer films Example 9-Fb and Comparative G-A6-Fb containing 30 weight % LDPE, and; monolayer film Comparative LDPE-F containing 100% LDPE.

Shrink tunnel test results are shown in FIG. 10b for the following monolayer films: Example 9-Fb, Comparative G-A6-Fb and Comparative LDPE-F. Comparing the two LDPE lean (30 wt % LDPE) blends; Example 9-Fb has consistently higher machine direction shrink tunnel shrink force, relative to Comparative G-A6-Fb. Consistent with FIG. 10a, FIG. 10b shows the advantage of using Type II ($-1 \leq DPI^{SCB} \leq 1$) heterogeneous ethylene interpolymers in LDPE lean blends in collation shrink film applications; relative to conventional Type IV ($DPI^{SCB} > 1.0$) heterogeneous ethylene interpolymers. The shrink tunnel test data shown in FIG. 10b was reproduced in tabular form in Table 7b. The right most column of Table 7b shows that at conveyor speeds from 30 to 60 ft/min LDPE lean shrink films containing Type II ($-1 \leq DPI^{SCB} \leq 1$) heterogeneous ethylene interpolymers have about 32% higher MD shrink tunnel shrink force, relative to a film of similar chemical composition but the heterogeneous ethylene interpolymer is Type IV ($DPI^{SCB} > 1.0$).

TABLE 1

Short Chain Branching Distribution Profile Index, "$DPI^{SCB}$" of Ethylene/α-olefin Copolymers (SCB (2-Methyl Corrected))

| Resin Code | Melt Index, $I_2$ (dg/min) | Base[1] Resin Density (g/cc) | SCB/1000C | | |
|---|---|---|---|---|---|
| | | | $SCB_{Log(M1)}$ | $SCB_{Log(M2)}$ | $DPI^{SCB}$ |
| Example 1 | 0.9 | 0.9122 | 19.02 | 18.03 | 0.993 |
| Example 2 | 0.8 | 0.9177 | 14.70 | 13.80 | 0.900 |
| Example 3 | 2.35 | 0.9196 | 13.80 | 13.07 | 0.736 |
| Example 4 | 1.0 | 0.9202 | 13.15 | 12.18 | 0.968 |
| Example 5 | 0.75 | 0.9260 | 8.098 | 7.854 | 0.244 |
| Example 6 | 0.58 | 0.9301 | 3.890 | 4.140 | −0.250 |
| Example 7 | 0.52 | 0.9329 | 2.190 | 2.350 | −0.160 |
| Example 8 | 0.51 | 0.9333 | 2.420 | 2.380 | 0.040 |
| Example 9 | 0.55 | 0.9341 | 1.970 | 2.260 | −0.290 |
| Comp. S1 | 0.9 | 0.9190 | 18.25 | 13.53 | 4.73 |
| Comp. S2 | 1.0 | 0.9200 | 13.67 | 11.09 | 2.57 |
| Comp. S3 | 0.55 | 0.9410 | 6.150 | 3.880 | 2.27 |
| Comp. G-A1 | 0.8 | 0.9160 | 23.50 | 19.42 | 4.08 |
| Comp. G-A2 | 1.0 | 0.9180 | 21.77 | 18.39 | 3.38 |
| Comp. G-A3 | 2.0 | 0.9180 | 22.86 | 19.08 | 3.78 |
| Comp. G-A4 | 0.8 | 0.9210 | 17.40 | 14.03 | 3.37 |
| Comp. G-A5 | 0.8 | 0.9260 | 12.90 | 8.940 | 3.96 |
| Comp. G-A6 | 0.75 | 0.9344 | 7.963 | 6.323 | 1.64 |
| Comp. G-A7 | 2.0 | 0.9420 | 5.020 | 3.795 | 1.23 |
| Comp. G-B1 | 0.5 | 0.9170 | 20.50 | 18.10 | 2.40 |
| Comp. G-B2 | 1.0 | 0.9200 | 17.20 | 14.40 | 2.80 |

[1]heterogeneous ethylene interpolymer density prior to the addition of additives

TABLE 2

Continuous Solution Process Conditions used to Produce Examples 6 and 9

| Process Parameter | Example 6 | Example 9 |
|---|---|---|
| R1 Catalyst | on-line Ziegler-Natta | on-line Ziegler-Natta |
| R1 component (iii) (ppm) | 4.00 | 3.77 |
| R1 [component(ii)/component(i)] mole ratio | 2.04 | 1.86 |
| R1 [component (iv)/component (iii)] mole ratio | 1.35 | 1.35 |
| R1 [component (v)/component (iii)] mole ratio | 0.35 | 0.35 |
| R1 volume (L) | 22.0 | 22.0 |
| R2 volume (L) | 18.0 | 18.0 |
| R1 Ethylene Split, $ES^{R1}$ (%) | 80 | 80 |
| R2 Ethylene Split, $ES^{R2}$ (%) | 20 | 20 |
| R1 ethylene concentration (wt %) | 12.5 | 12.8 |
| R2 ethylene concentration (wt %) | 14.3 | 14.7 |
| ((1-octene)/(ethylene))$^{R1}$ (wt % ratio) | 0.180 | 0.120 |
| Octene Split, $OS^{R1}$ (%) | 100 | 100 |
| Octene Split, $OS^{R2}$ (%) | 0.0 | 0.0 |
| R1 Hydrogen, $H_2^{R1}$ (ppm) | 0.747 | 0.966 |
| R2 Hydrogen, $H_2^{R2}$ (ppm) | 0.499 | 0.500 |
| Total solution flow (kg/h) | 600 | 600 |
| R1 inlet temperature (° C.) | 30.0 | 30.0 |
| R2 inlet temperature (° C.) | 130 | 129 |
| R1 mean temperature (° C.) | 187 | 190 |
| R2 exit temperature (° C.) | 214 | 215 |

TABLE 2-continued

Continuous Solution Process Conditions used to Produce Examples 6 and 9

| Process Parameter | Example 6 | Example 9 |
|---|---|---|
| $Q^T$, total conversion (%) | 91.0 | 91.1 |
| Production Rate (kg/h) | 89.0 | 87.7 |

TABLE 3

Analytical characterization of Example 6, Example 9 and Comparative G-A6

| | | Heterogeneous Ethylene Interpolymers | | |
|---|---|---|---|---|
| Parameter | Method | Example 6 | Example 9 | Comparative G-A6 |
| $DPI^{SCB}$ (SCB/1000C) | Internal GPC-FTIR | −0.25 | −0.29 | 1.64 |
| Density (g/cc) | ASTM D792 | 0.9290 | 0.9339 | 0.9346 |
| Melt Index $I_2$ (dg/min) | ASTM D1238 | 0.56 | 0.55 | 0.70 |
| Melt Index $I_6$ (dg/min) | ASTM D1238 | 2.29 | 2.28 | 2.80 |
| Melt Index $I_{21}$ (dg/min) | ASTM D1238 | 14.3 | 14.6 | 17.3 |
| Melt Flow Ratio ($I_{21}/I_2$) | ASTM D1238 | 25.8 | 26.6 | 24.8 |
| Stress Exponent | Internal | 1.29 | 1.29 | 1.27 |
| Comonomer | ASTM D6645 | octene | octene | Hexene |
| Branch Freq./1000C[a] | ASTM D6645 | 5.7 | 4.1 | 7.3 |
| Comonomer (mole %) | ASTM D6645 | 1.1 | 0.80 | 1.5 |
| High Elution Peak (° C.) | Internal C-TREF | 94.2 | 94.4 | 95.9 |
| Low Elution Peak (° C.) | Internal C-TREF | 87.9 | 88 (shoulder) | 85 |
| $CDBI_{50}$ (%) | Internal C-TREF | 65.7 | 72.6 | 53.5 |
| $CDBI_{25}$ (%) | Internal C-TREF | 30.8 | 37.6 | 22.2 |
| Co/Ho | Internal C-TREF | 1.3 | 0.6 | 0.7 |
| DSC Crystallinity (%) | Internal | 54.6 | 58.2 | 56.1 |
| GPC Mn (dalton) | ASTM D6474 | 33,196 | 36,081 | 39,725 |
| GPC Mw (dalton) | ASTM D6474 | 122,597 | 130,866 | 117,766 |
| GPC Mz (dalton) | ASTM D6474 | 344,728 | 366,564 | 294,742 |
| Polydispersity: Mw/Mn | ASTM D6474 | 3.69 | 3.63 | 2.96 |
| Polydispersity: Mz/Mw | ASTM D6474 | 2.81 | 2.80 | 2.50 |

[a]branch frequency based on total methyl content (uncorrected for methyl chain ends)

TABLE 4

| Film Code | Monolayer Blown Film Composition (weight %) | | |
|---|---|---|---|
| Example 6-Fa | 37% Example 6 | 60% LDPE[a] | 3% MB[b] |
| Example 9-Fa | 36% Example 9 | 60% LDPE | 4% MB |
| Comparative G-A6-Fa[c] | 40% Comparative G-A6 | 60% LDPE | |
| Example 6-Fb | 66% Example 6 | 30% LDPE | 4% MB |
| Example 9-Fb | 66% Example 9 | 30% LDPE | 4% MB |
| Comparative G-A6-Fb[c] | 70% Comparative G-A6 | 30% LDPE | |
| Comparative LDPE-F | | 100% LDPE | |

[a]LDPE: high pressure low density polyethylene LF-Y320-C (0.25 melt index ($I_2$), 0.920 g/cc (base ethylene polymer density), LF-Y320-C contained 3500 ppm antiblock (SUPER FLOSS diatomaceous earth, CAS No. 68855-54-9).
[b]MB refers to "MasterBatch", the MB contained 5 wt % of a fluoroelastomer processing aid (based on the combined weight of fluoroelastomer and carrier resin) in a carrier resin (LLDPE, 2.2 dg/min and 0.92 g/cc).
[c]'control shrink film' in claims TABLE 5a Blown Film Conditions

| Parameter | Example 6-Fa | Example 9-Fa | Comparative G-A6-Fa[a] | Comparative LDPE-F |
|---|---|---|---|---|
| Output (lb/hr) | 100 | 100 | 100 | 100 |
| FLH (inch) | 18 | 18 | 18 | 18 |
| Barrel Zone 1 (° F.) | 420 | 420 | 420 | 422 |
| Barrel Zone 2 (° F.) | 400 | 401 | 400 | 402 |
| Barrel Zone 3 (° F.) | 400 | 401 | 401 | 401 |
| Barrel Zone 4 (° F.) | 399 | 400 | 399 | 399 |
| Adapter Zone 9 (° F.) | 418 | 418 | 418 | 419 |
| Block Zone 10 (° F.) | 421 | 421 | 421 | 421 |
| Die Zone 11 (° F.) | 420 | 420 | 241 | 419 |
| Die Zone 12 (° F.) | 440 | 440 | 439 | 440 |
| Polymer Melt Temp (° F.) | 436 | 436 | 434 | 426 |
| Die Mill Gap (mils) | 35 | 35 | 35 | 35 |
| Magnehelic (in-$H_2O$) | 8 | 8 | 8 | 8 |
| Current: (Amps) | 35.8 | 36.4 | 35.7 | 27.1 |
| Voltage: (Volts) | 210 | 210 | 210 | 210 |
| Pressure (psi) {min to max} | 4145 to 4175 | 4225 to 4260 | 4005 to 4045 | 3055 to 3090 |
| Screw Speed (rpm) | 50 | 40 | 47 | 51 |
| Speed: (ft/min) | 57 | 57 | 57 | 57 |
| Nip Pressure (psi) | 30 | 30 | 30 | 30 |
| Blow-up-Ratio | 2.5:1 | 2.5:1 | 2.5:1 | 2.5:1 |
| Layflat (inch) | 15.7 | 15.7 | 15.7 | 15.7 |
| Thickness (mil) | 2.25 | 2.25 | 2.25 | 2.25 |

[a]'control shrink film' in claims

TABLE 5b

Blown Film Conditions

| Parameter | Example 6-Fb | Example 9-Fb | Comparative G-A6-Fb[a] | Comparative LDPE-F |
|---|---|---|---|---|
| Output (lb/hr) | 100 | 100 | 100 | 100 |
| FLH (inch) | 18 | 18 | 18 | 18 |
| Barrel Zone 1 (° F.) | 421 | 420 | 420 | 422 |
| Barrel Zone 2 (° F.) | 401 | 401 | 401 | 402 |
| Barrel Zone 3 (° F.) | 400 | 401 | 400 | 401 |
| Barrel Zone 4 (° F.) | 400 | 400 | 399 | 399 |
| Adapter Zone 9 (° F.) | 419 | 418 | 418 | 419 |
| Block Zone 10 (° F.) | 421 | 421 | 421 | 421 |
| Die Zone 11 (° F.) | 420 | 419 | 420 | 419 |
| Die Zone 12 (° F.) | 440 | 440 | 440 | 440 |
| Polymer Melt Temp (° F.) | 437 | 437 | 434 | 426 |
| Die Mill Gap (mils) | 35 | 35 | 35 | 35 |
| Magnehelic (in-H$_2$O) | 8 | 8 | 7.5 | 8 |
| Current: (Amps) | 40.7 | 41.2 | 35.6 | 27.1 |
| Voltage: (Volts) | 210 | 210 | 210 | 210 |
| Pressure (psi) | 4635 to 4675 | 4740 to 4775 | 4300 to 4340 | 3055 to 3090 |
| Screw Speed (rpm) | 47 | 49 | 43 | 51 |
| Speed: (ft/min) | 57 | 57 | 57 | 57 |
| Nip Pressure (psi) | 30 | 30 | 30 | 30 |
| Blow-up-Ratio | 2.5:1 | 2.5:1 | 2.5:1 | 2.5:1 |
| Layflat (inch) | 15.7 | 15.7 | 15.7 | 15.7 |
| Thickness (mil) | 2.25 | 2.25 | 2.25 | 2.25 |

[a]'control shrink film' in claims

TABLE 6a

Blown Film Properties: Puncture and Modulus

| Physical Property | Units | Method | Example 6-Fa | Example 9-Fa | Comparative G-A6-Fa[a] | Comparative LDPE-F |
|---|---|---|---|---|---|---|
| Film Thickness | mil | Micrometer | 2.35 | 2.35 | 2.36 | 2.38 |
| Puncture Energy at Break | J/mm | ASTM D5748 | 31 | 29 | 22 | 24 |
| Puncture Peak Force at Break | lb | ASTM D5748 | 14 | 14.2 | 12.7 | 12.6 |
| Puncture Elongation at Break | inch | ASTM D5748 | 1.6 | 1.4 | 1.3 | 1.5 |
| MD 1% Secant Modulus | MPa | In-house | 249 | 270 | 270 | 175 |
| MD 2% Secant Modulus | MPa | In-house | 213 | 227 | 227 | 158 |
| TD 1% Secant Modulus | MPa | In-house | 315 | 329 | 337 | 212 |
| TD 2% Secant Modulus | MPa | In-house | 259 | 273 | 273 | 181 |

[a]'control shrink film' in claims

TABLE 6b

Blown Film Properties: Puncture and Modulus

| Physical Property | Units | Method | Example 6-Fb | Example 9-Fb | Comparative G-A6-Fb[a] | Comparative LDPE-F |
|---|---|---|---|---|---|---|
| Film Thickness | mil | Micrometer | 2.30 | 2.30 | 2.32 | 2.38 |
| Puncture Energy at Break | J/mm | ASTM D5748 | 38.0 | 33.0 | 23.0 | 24.0 |
| Puncture Peak Force at Break | lb | ASTM D5748 | 13.9 | 14.3 | 12.1 | 12.6 |
| Puncture Elongation at Break | inch | ASTM D5748 | 1.9 | 1.7 | 1.3 | 1.5 |
| MD 1% Secant Modulus | MPa | In-house | 293 | 326 | 349 | 175 |
| MD 2% Secant Modulus | MPa | In-house | 248 | 275 | 284 | 158 |
| TD 1% Secant Modulus | MPa | In-house | 370 | 394 | 430 | 212 |
| TD 2% Secant Modulus | MPa | In-house | 301 | 325 | 343 | 181 |

[a]'control shrink film' in claims

TABLE 6c

Blown Film Properties: Dart, Tear and Tensile

| Physical Property | Units | Method | Example 6-Fa | Example 9-Fa | Comparative G-A6-Fa[a] | Comparative LDPE-F |
|---|---|---|---|---|---|---|
| Film Thickness | mil | Micrometer | 2.35 | 2.35 | 2.36 | 2.38 |
| Dart Impact | g/mil | ASTM D1709 Method A | 83 | 72 | 75 | 106 |

TABLE 6c-continued

Blown Film Properties: Dart, Tear and Tensile

| Physical Property | Units | Method | Example 6-Fa | Example 9-Fa | Comparative G-A6-Fa[a] | Comparative LDPE-F |
|---|---|---|---|---|---|---|
| MD Elmendorf Tear | g/mil | ASTM D1922 | 65 | 51 | 64 | 88 |
| TD Elmendorf Tear | g/mil | ASTM D1922 | 316 | 315 | 224 | 101 |
| MD Tensile Break | MPa | ASTM D882 | 26.8 | 26.8 | 27.1 | 22.5 |
| MD Tensile Elongation | % | ASTM D882 | 356 | 340 | 371 | 297 |
| MD Tensile Yield | MPa | ASTM D882 | 19.4 | 21.6 | 19.5 | 12.4 |
| MD Tensile Elongation at Yield | % | ASTM D882 | 58 | 66 | 57 | 28 |
| TD Tensile Break | MPa | ASTM D882 | 25.8 | 26.6 | 23.4 | 20.5 |
| TD Tensile Elongation | % | ASTM D882 | 729 | 766 | 708 | 582 |
| TD Tensile Yield | MPa | ASTM D882 | 13.2 | 13.7 | 13.8 | 10.8 |
| TD Tensile Elongation at Yield | % | ASTM D882 | 12 | 12 | 12 | 13 |

[a]'control shrink film' in claims

TABLE 6d

Blown Film Properties: Dart, Tear and Tensile

| Physical Property | Units | Method | Example 6-Fb | Example 9-Fb | Comparative G-A6-Fb[a] | Comparative LDPE-F |
|---|---|---|---|---|---|---|
| Film Thickness | mil | Micrometer | 2.3 | 2.3 | 2.32 | 2.38 |
| Dart Impact | g/mil | ASTM D1709 Method A | 101 | 79 | 62 | 106 |
| MD Elmendorf Tear | g/mil | ASTM D1922 | 95 | 62 | 47 | 88 |
| TD Elmendorf Tear | g/mil | ASTM D1922 | 601 | 592 | 514 | 101 |
| MD Tensile Break | MPa | ASTM D882 | 33.3 | 35.2 | 32 | 22.5 |
| MD Tensile Elongation | % | ASTM D882 | 622 | 644 | 656 | 297 |
| MD Tensile Yield | MPa | ASTM D882 | 14 | 15.1 | 15.4 | 12.4 |
| MD Tensile Elongation at Yield | % | ASTM D882 | 18 | 15 | 17 | 28 |
| TD Tensile Break | MPa | ASTM D882 | 32 | 32.5 | 29.2 | 20.5 |
| TD Tensile Elongation | % | ASTM D882 | 789 | 829 | 837 | 582 |
| TD Tensile Yield | MPa | ASTM D882 | 15 | 16.4 | 16.1 | 10.8 |
| TD Tensile Elongation at Yield | % | ASTM D882 | 12 | 11 | 12 | 13 |

[a]'control shrink film' in claims

TABLE 7a

Machine Direction (MD) Shrink Tunnel Shrink Force of Monolayer Films: Example 9-Fa and Comparative G-A6-Fa contain 60 wt % LDPE

| Conveyor (ft/min) | MD Shrink Tunnel Shrink Force (kg) | | | % Improved[a] | Avg. % Improved |
|---|---|---|---|---|---|
| | Comparative LDPE-F | Example 9-Fa | Comparative G-A6-Fa[b] | | |
| 30 | 1.06 | 1.80[P] | 1.59[F] | 13 | 8.0 |
| 40 | 1.22 | 1.87[P] | 1.71[F] | 9.4 | |
| 50 | 1.30 | 2.10[P] | 2.02[P] | 4.0 | |
| 60 | 1.47 | 2.05[P] | 1.91[P] | 7.3 | |

TABLE 7a-continued

Machine Direction (MD) Shrink Tunnel Shrink Force of Monolayer Films: Example 9-Fa and Comparative G-A6-Fa contain 60 wt % LDPE

| Con-veyor (ft/min) | MD Shrink Tunnel Shrink Force (kg) | | | % Improved[a] | Avg. % Improved |
|---|---|---|---|---|---|
| | Comparative LDPE-F | Example 9-Fa | Comparative G-A6-Fa[b] | | |
| 70 | 1.58 | 1.56[F] | 1.00[F] | 56 | not included in Average |

[a]((Example 9-Fa) − (Comparative G-A6-Fa)) × 100/(Comparative G-A6-Fa)
[b]'control shrink film' in claims
[P]Pass: MD shrink tunnel shrink for is ≥1.75 kg
[F]Fail: MD shrink tunnel shrink force is <1.75 kg TABLE 7b Machine Direction (MD) Shrink Tunnel Shrink Force of Monolayer Films: Example 9-Fb and Comparative G-A6-Fb contain 30 wt % LDPE

| Con-veyor (ft/min) | MD Shrink Tunnel Shrink Force (kg) | | | % Improved[a] | Average % Improved |
|---|---|---|---|---|---|
| | Comparative LDPE-F | Example 9-Fb | Comparative G-A6-Fb[b] | | |
| 30 | 1.06 | 1.62[F] | 1.42[F] | 14 | 32 |
| 40 | 1.22 | 2.08[P] | 1.99[P] | 4.5 | |
| 50 | 1.3 | 2.21[P] | 2.02[P] | 9.4 | |
| 60 | 1.47 | 1.42[F] | 0.71[F] | 100 | |

[a]((Example 9-Fb) − (Comparative G-A6-Fb)) × 100/(Comparative G-A6-Fb)
[b]'control shrink film' in claims
[P]Pass: MD shrink tunnel shrink for is ≥1.75 kg
[F]Fail: MD shrink tunnel shrink force is <1.75 kg

What is claimed is:

1. A shrink film comprising at least one heterogeneous ethylene interpolymer having: a density from about 0.911 g/cm³ to about 0.936 g/cm³, a melt index from about 0.3 dg/min to about 0.9 dg/min and a short chain branching distribution profile index, $DPI^{SCB}$, that satisfies formula (I);

$$-1 \leq DPI^{SCB} \leq 1 \quad (I)$$

wherein density is determined according to ASTM D-1505 and melt index is determined according to ASTM D-1238 at 190° C. and 2.16 kg.

2. The shrink film according to claim 1, wherein said at least one heterogeneous ethylene interpolymer has a molecular weight distribution, Mw/Mn, from about 2.5 to about 6.0.

3. The shrink film according to claim 1, wherein said at least one heterogeneous ethylene interpolymer is produced using an in-line Ziegler-Natta catalyst.

4. The shrink film according to claim 1, wherein said ethylene interpolymer contains one or more α-olefin; wherein said α-olefin is linear or branched $C_3$ to $C_{12}$.

5. The shrink film according to claim 4, wherein said α-olefin is 1-hexene, 1-octene or both.

6. The shrink film according to claim 1, further comprising from about 15 weight percent to about 80 weight percent of at least one high pressure ethylene polymer; wherein weight percent is based on the total weight of the shrink film.

7. The shrink film according to claim 1, further comprising from about 20 weight percent to about 60 weight percent of at least one high pressure ethylene polymer; wherein weight percent is based on the total weight of the shrink film.

8. The shrink film according to claim 6, wherein said at least one high pressure ethylene polymer has a density from about 0.917 g/cm³ to about 0.940 g/cm³ and a melt index from about 0.1 g/10 minutes to about 10 g/10 minutes.

9. The shrink film according to claim 7, wherein said shrink film has a film puncture strength improved at least 30%, relative to a control shrink film of the same composition but the control heterogeneous ethylene interpolymer has a $DPI^{SCB}$ greater than 1.0; wherein said film puncture strength is measured according to ASTM D5748-95; wherein said at least one high pressure ethylene polymer has a density from about 0.918 g/cm³ to about 0.930 g/cm³ and a melt index from about 0.2 g/10 minutes to about 2 g/10 minutes.

10. The film according to claim 7, wherein said shrink film has a machine direction shrink tunnel shrink force improved at least 8%, relative to a control film of the same composition but the control heterogeneous ethylene interpolymer has a $DPI^{SCB}$ greater than 1.0; wherein said machine direction shrink tunnel shrink force is recorded after passing said shrink film through a shrink tunnel at conveyor speeds from about 30 feet/minute to about 60 feet/min and said shrink tunnel is maintained at 400° F.; wherein said at least one high pressure ethylene polymer has a density from about 0.918 g/cm³ to about 0.930 g/cm³ and a melt index from about 0.2 g/10 minutes to about 2 g/10 minutes.

11. A multilayer shrink film having a shrink layer and at least one other layer wherein said shrink layer comprises at least one heterogeneous ethylene interpolymer having: a density from about 0.911 g/cm³ to about 0.936 g/cm³, a melt index from about 0.3 dg/min to about 0.9 dg/min and a short chain branching distribution profile index, $DPI^{SCB}$, that satisfies formula (I);

$$-1 < DPI^{SCB} \leq 1 \quad (I)$$

wherein density is determined according to ASTM D-1505 and melt index is determined according to ASTM D-1238 at 190° C. and 2.16 kg.

12. The multilayer shrink film according to claim 11, wherein said at least one heterogeneous ethylene interpolymer has a molecular weight distribution, Mw/Mn, from about 2.5 to about 6.0.

13. The multilayer shrink film according to claim 11, wherein said at least one heterogeneous ethylene interpolymer is produced using an in-line Ziegler-Natta catalyst.

14. The multilayer shrink film according to claim 11, wherein said at least one heterogeneous ethylene interpolymer contains one or more α-olefin; wherein said α-olefin is linear or branched $C_3$ to $C_{12}$.

15. The multilayer shrink film according to claim 14, wherein said one or more α-olefin is 1-hexene, 1-octene or both.

16. The multilayer shrink film according to claim 11, wherein said shrink layer further comprises from about 15 weight percent to about 80 weight percent of at least one high pressure ethylene polymer; wherein weight percent is based on the total weight of said shrink layer.

17. The multilayer shrink film according to claim 11, wherein said shrink layer further comprises from about 20 weight percent to about 60 weight percent of at least one high pressure ethylene polymer; wherein weight percent is based on the total weight of said shrink layer.

18. The multilayer shrink film according to claim 16, wherein said at least one high pressure ethylene polymer has a density from about 0.917 g/cm³ to about 0.940 g/cm³ and a melt index from about 0.1 g/10 minutes to about 10 g/10 minutes.

19. The multilayer shrink film according to claim 17, wherein said at least one high pressure ethylene polymer has a density from about 0.918 g/cm³ to about 0.930 g/cm³ and a melt index from about 0.2 g/10 minutes to about 2 g/10 minutes.

\* \* \* \* \*